United States Patent
Alexanian

(10) Patent No.: US 8,874,275 B2
(45) Date of Patent: *Oct. 28, 2014

(54) LANDSCAPE IRRIGATION MANAGEMENT WITH AUTOMATED WATER BUDGET AND SEASONAL ADJUST, AND AUTOMATED IMPLEMENTATION OF WATERING RESTRICTIONS

(71) Applicant: George Alexanian, Fresno, CA (US)

(72) Inventor: George Alexanian, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,908

(22) Filed: Sep. 16, 2013

(65) Prior Publication Data

US 2014/0081470 A1    Mar. 20, 2014

Related U.S. Application Data

(63) Continuation of application No. 13/276,219, filed on Oct. 18, 2011, now Pat. No. 8,538,592, which is a continuation-in-part of application No. 13/159,071, filed on Jun. 13, 2011, now abandoned, which is a continuation-in-part of application No. 12/011,801, filed on Jan. 30, 2008, now Pat. No. 7,962,244, which is a continuation-in-part of application No. 11/879,700, filed on Jul. 17, 2007, now Pat. No. 7,844,368, which is a continuation-in-part of application No. 11/336,690, filed on Jan. 20, 2006, now Pat. No. 7,266,428, which is a continuation-in-part of application No. 10/824,667, filed on Apr. 13, 2004, now Pat. No. 7,058,478.

(60) Provisional application No. 60/465,457, filed on Apr. 25, 2003.

(51) Int. Cl.
*G05D 11/00* (2006.01)
*A01G 25/00* (2006.01)
*A01G 25/16* (2006.01)

(52) U.S. Cl.
CPC .................................... *A01G 25/16* (2013.01)
USPC ............................................. 700/284; 239/69

(58) Field of Classification Search
CPC ................. A01G 25/16; A01G 25/167; G05B 2219/2625
USPC .............................. 700/284; 239/68–70, 723; 137/78.1–78.3, 624.11–624.15, 137/624.21; 405/36, 37
See application file for complete search history.

(56) References Cited

U.S. PATENT DOCUMENTS 3,058,346 A   10/1962   Rudomanski et al.
3,114,243 A   12/1963   Winters (Continued)

FOREIGN PATENT DOCUMENTS

| CA | 2448633 A1 * | 12/2002 | ............. G05B 13/00 |
| WO | WO 9103156 A1 * | 3/1991 | ............. A01G 25/16 |
| WO | 0246852 | 6/2002 | |

OTHER PUBLICATIONS

"Weather and Soil Moisture Based Landscape Irrigation Scheduling Devices—Technical Review Report, 3rd Edition" US Department of the Interior, Bureau of Reclamation, Sep. 2009.

(Continued)

*Primary Examiner* — M. N. Von Buhr
(74) *Attorney, Agent, or Firm* — Mark D. Miller

(57) ABSTRACT

Embodiments of the present invention provide methods and apparatus for water conservation with landscape irrigation controllers, plug-in and add-on devices, and centralized systems. In embodiments of the invention, a water budget percentage is determined by comparing current local geo-environmental data with stored local geo-environmental data, and the preliminary irrigation schedule or station run times are automatically modified based upon that water budget percentage. Embodiments of the present invention also provide for automation of mandated landscape watering restrictions alone, or in various combinations with water budgeting methods and apparatus.

73 Claims, 24 Drawing Sheets

(56) References Cited

U.S. PATENT DOCUMENTS

| | | | |
|---|---|---|---|
| 3,372,899 | A | 3/1968 | McPhearson |
| 3,653,595 | A | 4/1972 | Greengard et al. |
| 3,726,477 | A | 4/1973 | Shapiro |
| 3,787,728 | A | 1/1974 | Bayer et al. |
| 3,902,825 | A | 9/1975 | Quillen |
| 3,987,845 | A | 10/1976 | Potthoff et al. |
| 4,010,898 | A | 3/1977 | Williams |
| 4,146,049 | A | 3/1979 | Kruse et al. |
| 4,176,395 | A | 11/1979 | Evelyn-Veere |
| 4,185,650 | A | 1/1980 | Neves et al. |
| 4,208,630 | A | 6/1980 | Martinez |
| 4,209,131 | A | 6/1980 | Barash et al. |
| 4,265,403 | A | 5/1981 | Bonetti |
| 4,333,490 | A | 6/1982 | Enter, Sr. |
| RE31,023 | E | 9/1982 | Hall, III |
| 4,396,149 | A | 8/1983 | Hirsch |
| 4,396,150 | A | 8/1983 | Burrough |
| 4,431,338 | A | 2/1984 | Hornabrook |
| 4,502,288 | A | 3/1985 | Lynch |
| 4,526,034 | A | 7/1985 | Campbell et al. |
| 4,545,396 | A | 10/1985 | Miller et al. |
| 4,548,225 | A | 10/1985 | Busalacchi |
| 4,567,563 | A | 1/1986 | Hirsch |
| 4,569,020 | A | 2/1986 | Snoddy et al. |
| 4,575,004 | A | 3/1986 | Geiger |
| 4,599,889 | A | 7/1986 | Pateras Pescara de Castelluccio |
| 4,613,077 | A | 9/1986 | Aronson |
| 4,613,764 | A | 9/1986 | Lobato |
| 4,626,984 | A | 12/1986 | Unruh et al. |
| 4,646,224 | A | 2/1987 | Ransburg et al. |
| 4,684,920 | A | 8/1987 | Reiter |
| 4,691,341 | A | 9/1987 | Knoble et al. |
| 4,709,585 | A | 12/1987 | Altenhofen |
| 4,755,942 | A | 7/1988 | Gardner et al. |
| 4,789,097 | A | 12/1988 | Anderson et al. |
| 4,837,499 | A | 6/1989 | Sherer, III |
| 4,852,802 | A | 8/1989 | Iggulden et al. |
| 4,856,227 | A | 8/1989 | Oglevee et al. |
| 4,858,377 | A | 8/1989 | Oglevee et al. |
| 4,876,647 | A | 10/1989 | Gardner et al. |
| 4,913,351 | A | 4/1990 | Costa |
| 4,921,001 | A | 5/1990 | Pittsinger |
| 4,922,433 | A | 5/1990 | Mark |
| 4,934,400 | A | 6/1990 | Cuming |
| 4,952,868 | A | 8/1990 | Scherer, III |
| 4,962,522 | A | 10/1990 | Marian |
| 4,967,789 | A | 11/1990 | Kypris |
| 4,992,942 | A | 2/1991 | Bauerlie et al. |
| 5,023,787 | A | 6/1991 | Everlyn-Veere |
| 5,097,861 | A | 3/1992 | Hopkins et al. |
| 5,101,083 | A | 3/1992 | Tyler et al. |
| 5,121,340 | A | 6/1992 | Campbell et al. |
| 5,141,332 | A | 8/1992 | Bergstein |
| 5,148,826 | A | 9/1992 | Bakhshaei |
| 5,208,855 | A | 5/1993 | Marian |
| 5,229,937 | A | 7/1993 | Evelyn-Veere |
| 5,244,177 | A | 9/1993 | Campbell et al. |
| 5,251,153 | A | 10/1993 | Nielsen et al. |
| 5,321,578 | A | 6/1994 | Morrison et al. |
| 5,337,957 | A | 8/1994 | Olson |
| 5,341,831 | A | 8/1994 | Zur |
| 5,355,122 | A | 10/1994 | Erickson |
| 5,375,617 | A | 12/1994 | Young |
| 5,444,611 | A | 8/1995 | Woytowitz et al. |
| 5,445,176 | A | 8/1995 | Goff |
| 5,465,904 | A | 11/1995 | Vaello |
| 5,479,338 | A | 12/1995 | Ericksen et al. |
| 5,479,339 | A | 12/1995 | Miller |
| 5,638,847 | A | 6/1997 | Hock, Jr. et al. |
| 5,696,671 | A | 12/1997 | Oliver |
| 5,740,031 | A | 4/1998 | Gagnon |
| 5,836,339 | A | 11/1998 | Klever et al. |
| 5,839,660 | A | 11/1998 | Morganstern et al. |
| 5,853,122 | A | 12/1998 | Capiro |
| 5,870,302 | A | 2/1999 | Oliver |
| 5,908,157 | A | 6/1999 | Antonellis et al. |
| 5,921,280 | A | 7/1999 | Ericksen et al. |
| 5,960,813 | A | 10/1999 | Sturman et al. |
| 6,016,971 | A | 1/2000 | Welch et al. |
| 6,076,740 | A | 6/2000 | Townsend |
| 6,088,621 | A | 7/2000 | Woytowitz et al. |
| 6,098,898 | A | 8/2000 | Storch |
| 6,102,061 | A | 8/2000 | Addink |
| 6,145,755 | A | 11/2000 | Feltz |
| 6,173,727 | B1 | 1/2001 | Davey |
| 6,227,220 | B1 | 5/2001 | Addink |
| 6,250,091 | B1 | 6/2001 | Jerome |
| 6,257,264 | B1 | 7/2001 | Sturman et al. |
| 6,259,955 | B1 | 7/2001 | Brundisini et al. |
| 6,267,298 | B1 | 7/2001 | Campbell |
| 6,298,285 | B1 | 10/2001 | Addink et al. |
| 6,312,191 | B1 | 11/2001 | Rosenfeld |
| 6,314,340 | B1 | 11/2001 | Mecham et al. |
| 6,343,255 | B1 | 1/2002 | Peek et al. |
| 6,397,162 | B1 | 5/2002 | Ton |
| 6,401,742 | B1 | 6/2002 | Cramer et al. |
| 6,402,048 | B1 | 6/2002 | Collins |
| 6,452,499 | B1 | 9/2002 | Runge et al. |
| 6,453,215 | B1 | 9/2002 | Lavoie |
| 6,453,216 | B1 | 9/2002 | McCabe et al. |
| 6,585,168 | B1 | 7/2003 | Capiro |
| 6,589,033 | B1 | 7/2003 | Johnson et al. |
| 6,675,098 | B2 | 1/2004 | Peek et al. |
| 6,714,134 | B2 | 3/2004 | Addink et al. |
| 6,748,327 | B1 | 6/2004 | Watson |
| 6,766,817 | B2 | 7/2004 | da Silva |
| 6,795,767 | B2 | 9/2004 | Nakamoto et al. |
| 6,823,239 | B2 | 11/2004 | Sieminski |
| 6,892,113 | B1 | 5/2005 | Addink et al. |
| 6,892,114 | B1 | 5/2005 | Addink et al. |
| 6,895,987 | B2 | 5/2005 | Addink et al. |
| 6,898,467 | B1 | 5/2005 | Smith et al. |
| 6,918,404 | B2 | 7/2005 | da Silva |
| 6,938,834 | B2 | 9/2005 | Harris |
| 6,944,523 | B2 | 9/2005 | Addink et al. |
| 6,947,811 | B2 | 9/2005 | Addink et al. |
| 6,950,728 | B1 | 9/2005 | Addink et al. |
| 6,963,808 | B1 | 11/2005 | Addink et al. |
| 7,010,394 | B1 | 3/2006 | Runge et al. |
| 7,010,395 | B1 * | 3/2006 | Goldberg et al. ............. 700/284 |
| 7,010,396 | B2 | 3/2006 | Ware et al. |
| 7,048,204 | B1 | 5/2006 | Addink et al. |
| 7,050,887 | B2 | 5/2006 | Alvarez |
| 7,058,478 | B2 | 6/2006 | Alexanian |
| 7,058,479 | B2 | 6/2006 | Miller |
| 7,063,270 | B2 | 6/2006 | Bowers et al. |
| 7,066,586 | B2 | 6/2006 | da Silva |
| 7,096,094 | B2 | 8/2006 | Addink et al. |
| 7,165,730 | B2 | 1/2007 | Clark et al. |
| 7,229,026 | B2 | 6/2007 | Evelyn-Veere |
| 7,236,908 | B2 | 6/2007 | Timko et al. |
| 7,243,005 | B1 | 7/2007 | Beutler et al. |
| 7,245,991 | B1 | 7/2007 | Woytowitz |
| 7,248,945 | B2 | 7/2007 | Woytowitz |
| 7,257,465 | B2 * | 8/2007 | Perez et al. ................... 700/284 |
| 7,266,428 | B2 | 9/2007 | Alexanian |
| 7,286,904 | B2 | 10/2007 | Graham |
| 7,317,972 | B2 | 1/2008 | Addink et al. |
| 7,330,796 | B2 | 2/2008 | Addink et al. |
| 7,337,042 | B2 | 2/2008 | Marian et al. |
| 7,363,113 | B2 | 4/2008 | Runge et al. |
| 7,403,840 | B2 | 7/2008 | Moore et al. |
| 7,406,363 | B2 | 7/2008 | Doering et al. |
| 7,412,303 | B1 | 8/2008 | Porter et al. |
| 7,413,380 | B2 | 8/2008 | Corwon et al. |
| 7,430,458 | B2 | 9/2008 | Dansereau et al. |
| 7,439,867 | B2 | 10/2008 | Staples |
| 7,444,207 | B2 | 10/2008 | Nickerson et al. |
| 7,487,925 | B2 | 2/2009 | Skinner |
| 7,513,755 | B2 | 4/2009 | Geisinger et al. |
| 7,522,975 | B2 | 4/2009 | Perez |
| 7,532,954 | B2 | 5/2009 | Evelyn-Veere et al. |
| 7,552,632 | B2 | 6/2009 | Runge et al. |
| 7,584,023 | B1 | 9/2009 | Palmer et al. |

(56) References Cited

U.S. PATENT DOCUMENTS

| | | | |
|---|---|---|---|
| 7,596,429 B2 | 9/2009 | Cardinal et al. | |
| 7,613,546 B2 | 11/2009 | Nelson et al. | |
| 7,640,079 B2 | 12/2009 | Nickerson et al. | |
| 7,711,454 B2* | 5/2010 | Addink | 700/284 |
| 7,769,494 B1 | 8/2010 | Simon et al. | |
| 7,788,970 B2 | 9/2010 | Hitt et al. | |
| 7,805,221 B2 | 9/2010 | Nickerson | |
| 7,810,515 B2 | 10/2010 | Nies et al. | |
| 7,844,368 B2 | 11/2010 | Alexanian | |
| 7,853,363 B1 | 12/2010 | Porter et al. | |
| 7,877,168 B1 | 1/2011 | Porter et al. | |
| 7,953,517 B1 | 5/2011 | Porter et al. | |
| 7,957,843 B2 | 6/2011 | Sacks | |
| 7,962,244 B2 | 6/2011 | Alexanian | |
| 7,962,245 B2 | 6/2011 | Runge et al. | |
| 7,966,153 B2 | 6/2011 | Bangalore | |
| 8,014,904 B1 | 9/2011 | Woytowitz | |
| 8,145,357 B2 | 3/2012 | Nibler et al. | |
| 8,150,554 B2 | 4/2012 | Anderson | |
| 8,160,750 B2* | 4/2012 | Weiler | 700/284 |
| 8,193,930 B2 | 6/2012 | Petite et al. | |
| 8,215,570 B2 | 7/2012 | Hitt | |
| 8,401,705 B2 | 3/2013 | Alexanian | |
| 8,443,822 B2 | 5/2013 | Ivans | |
| 8,494,683 B2* | 7/2013 | Piper et al. | 700/284 |
| 8,538,592 B2* | 9/2013 | Alexanian | 700/284 |
| 8,620,480 B2* | 12/2013 | Alexanian | 700/284 |
| 2001/0049563 A1 | 12/2001 | Addink et al. | |
| 2002/0002425 A1 | 1/2002 | Dossey et al. | |
| 2002/0010516 A1 | 1/2002 | Addink et al. | |
| 2002/0020441 A1 | 2/2002 | Addink | |
| 2002/0027504 A1 | 3/2002 | Davis | |
| 2002/0060631 A1 | 5/2002 | Runge et al. | |
| 2002/0072829 A1 | 6/2002 | Addink et al. | |
| 2002/0091452 A1 | 7/2002 | Addink et al. | |
| 2002/0092965 A1 | 7/2002 | Addink et al. | |
| 2003/0025400 A1 | 2/2003 | Hall | |
| 2003/0080199 A1 | 5/2003 | Condreva | |
| 2003/0109964 A1 | 6/2003 | Addink et al. | |
| 2003/0178070 A1 | 9/2003 | Glicken | |
| 2003/0179102 A1 | 9/2003 | Barnes | |
| 2003/0182022 A1 | 9/2003 | Addink et al. | |
| 2003/0183018 A1 | 10/2003 | Addink et al. | |
| 2003/0208306 A1 | 11/2003 | Addink et al. | |
| 2003/0230638 A1 | 12/2003 | Dukes et al. | |
| 2004/0011880 A1 | 1/2004 | Addink et al. | |
| 2004/0015270 A1 | 1/2004 | Addink et al. | |
| 2004/0039489 A1 | 2/2004 | Moore et al. | |
| 2004/0089164 A1 | 5/2004 | Addink et al. | |
| 2004/0117070 A1 | 6/2004 | Barker | |
| 2004/0194833 A1 | 10/2004 | Townsend et al. | |
| 2004/0206405 A1* | 10/2004 | Smith et al. | 137/624.12 |
| 2004/0217189 A1 | 11/2004 | Regli | |
| 2005/0019184 A1 | 1/2005 | Geisinger et al. | |
| 2005/0137752 A1 | 6/2005 | Alvarez | |
| 2005/0171646 A1* | 8/2005 | Miller | 700/284 |
| 2005/0187665 A1 | 8/2005 | Fu | |
| 2005/0250440 A1 | 11/2005 | Zhou et al. | |
| 2005/0279856 A1 | 12/2005 | Nalbandian et al. | |
| 2006/0043208 A1 | 3/2006 | Graham | |
| 2006/0091245 A1 | 5/2006 | Ivans | |
| 2006/0116792 A1 | 6/2006 | Addink | |
| 2006/0122735 A1 | 6/2006 | Goldberg et al. | |
| 2006/0155489 A1 | 7/2006 | Addink | |
| 2006/0217846 A1 | 9/2006 | Woytowitz | |
| 2006/0293797 A1 | 12/2006 | Weiler | |
| 2007/0016334 A1 | 1/2007 | Smith et al. | |
| 2007/0156318 A1 | 7/2007 | Anderson et al. | |
| 2007/0179674 A1 | 8/2007 | Ensworth et al. | |
| 2007/0191991 A1 | 8/2007 | Addink | |
| 2007/0221744 A1 | 9/2007 | Simon et al. | |
| 2007/0282486 A1 | 12/2007 | Walker et al. | |
| 2007/0293990 A1 | 12/2007 | Alexanain | |
| 2008/0027586 A1 | 1/2008 | Hern et al. | |
| 2008/0119948 A1 | 5/2008 | O'Connor | |
| 2008/0167931 A1 | 7/2008 | Gerstemeier et al. | |
| 2009/0043427 A1 | 2/2009 | Addink | |
| 2009/0094097 A1 | 4/2009 | Gardenswartz | |
| 2009/0099701 A1* | 4/2009 | Li et al. | 700/284 |
| 2009/0138105 A1 | 5/2009 | Crawford | |
| 2009/0202366 A1 | 8/2009 | Geisinger et al. | |
| 2009/0281672 A1 | 11/2009 | Pourzia | |
| 2010/0010682 A1* | 1/2010 | Cardinal et al. | 700/284 |
| 2010/0030389 A1 | 2/2010 | Palmer et al. | |
| 2010/0030476 A1 | 2/2010 | Woytowytz | |
| 2010/0094472 A1 | 4/2010 | Woytowytz | |
| 2010/0106337 A1 | 4/2010 | Sacks | |
| 2010/0145530 A1 | 6/2010 | Nickerson | |
| 2010/0256827 A1 | 10/2010 | Bragg et al. | |
| 2010/0312404 A1 | 12/2010 | Nickerson | |
| 2011/0035063 A1* | 2/2011 | Palayur | 700/283 |
| 2011/0077785 A1 | 3/2011 | Nickerson et al. | |
| 2011/0238228 A1* | 9/2011 | Woytowitz et al. | 700/284 |
| 2011/0238229 A1 | 9/2011 | Woytowitz et al. | |
| 2011/0270448 A1* | 11/2011 | Kantor et al. | 700/284 |
| 2011/0301767 A1* | 12/2011 | Alexanian | 700/284 |
| 2014/0088770 A1* | 3/2014 | Masters et al. | 700/284 |

OTHER PUBLICATIONS

Mayer, P. et al. "Evaluation of California Weather-Based 'Smart' Irrigation Controller Programs," Jul. 1, 2009.
Hunt, T. and Lessick, D. et al., Residential Weather-Based Irrigation Scheduling: Evidence from the Irvine "ET Controller" Study (2001).
List of Principal Symbols and Acronyms; 2003, five web pages.
Cattaneo & Upham, Methods to Calculate Evapotranspiration Differences and Choices, 3-page article.
Water-Efficient Landscaping; 2001, 2-page article.
The Irrigation Association—Water Management Committee, Turf and Landscape Irrigation Best Management Practice, Appendix G, Deficit Irrigation Practice, Oct. 2002.
Engineer's Notebook No. 106, A Simple Evapotranspiration Model for Hawaii: The Hargreaves Model; CTAHR Fact Sheet, 1-page article, May 1997, Wu.
Austin Lawn Sprinkler Association, Technical Information-Using Evapotranspiration Data; Nov. 2002, 1-page webpage.
ET Different Formula, 1-page Chart.
USFAO, Preface page Web Page, Feb. 2003.
US Department of the Interior Bureau of Reclamation Lower Colorado Region Southern California Area Office, Temecula, California & Technical Service Center Water Resources Planning Operations Support Group, Denver, Colorado; Weather and Soil Moisture Based Landscape Irrigation Scheduling Devices; Reclamation Managing Water in the West, Aug. 2004; 135 pages.
Instructions, Model PK-1B pump controller, Mar. 1993.
"Irrigation & Green Industry" Magazine, Nov. 2010.
Universal Smart Module brochure, Aug. 2009.
Smart Clock brochure, original from approx. May 2007.
WeatherSmartPro brochure, Oct. 2009.
Aqua Conserve User's Guide, Jun. 2010.
Aqua Conserve ET-8 Series Manual, 2010.
Climate Logic wireless weather sensing system flyer, Nov. 2010.
WeatherSmart manual, Mar. 2010.
Irritrol, "Climate Logic" user manual, 2011.
Rain Bird, Simple-to-Set Smart Controller Operation Manual, 2010.
Hunter, X-Core residential irrigation controller manual, 2010.
Solar Sync sensors, 2011.
Metropolitan Water District of Southern California, The Watering Index and Watering Calculator, 2011.
Metropolitan Water District of Southern California, Save a Buck: Irrigation Controllers, 2011.
Enercon Plus Brochure, original from approx. May 2007.
"New ET manager cartridge from Rain Bird", SportsTurf (2009).
Wankhede, Mahendra, et al, "Evaluation of Cooling Solutions for Outdoor Electronics", Therminic (2007).
SolarSync Owner's Manual and Programming Instructions, Dec. 2009.
Toro ECXTRA Automatic Sprinkler System Control Timer, User's Guide.

(56) References Cited

OTHER PUBLICATIONS

Toro XTRA SMART Wireless weather sensor system installation and setup guide (2010).
Xaxx, Jagg, "The Effects of Solar Radiation on Metal", Dec. 2012.
"Solar Heat Gain" Hoffman (2011).
"Enclosure Design Considerations", Saginaw Control & Engineering (2007).
AquaConserve ACT-9 and ACT-14 Station Aqua Climate Tracker Irrigation Controller User's Guide (2001).
AquaConserve ACT-9 and ACT-14 Quick Reference & Installation Guide (2001).
Rain Bird ET Manager Cartridge for ESP-LX Modular, Installation & User Guide, Rain Bird (2008).
"Report on Perofrmance of ET Based Irrigation Controller—Analysis of Operation of WeatherTRAK (TM) Controller in Field Conditions During 2002," Aquacraft, Inc. Apr. 23, 2003.
"Reclamation, Managing Water in the West—Weather Based Technologies for Residential Irrigation Scheduling," Technical Review Report, U.S. Dept. of the Interior, May 2004.
"Reclamation, Managing Water in the West—Weather- and Soil Moisture-Based Landscape Irrigation Scheduling Devices," Technical Review Report, U.S. Dept. of the Interior, Jul. 2012.
Rain Bird ET Manager Series Installation and Operation Manual (2007).
Zotarelli, Lincoln, et al., "Step by Step Calculation of the Penman-Monteith Evapotranspriation (FAO-56 Method)", Agricultural and Biological Engineering Dept., Florida Cooperative Extension Service, Institute of Food and Ag Sciences, Univ. of Florida (Feb. 2010).
"Weather and Soil Moisture Based Landscape Irrigation Scheduling Devices", U.S. Dept. of the Interior, Bureau of Reclamation (Sep. 2009).
"Calculating Temperature Rise and Equipment De-Rating when Using Oberon Enclosures", Oberon (Wireless Communication Solutions) Jul. 16, 2012.
Hoffman, "Heat Dissipation in Electrical Enclosures" (2011).
"Protective cooling Solutions Overview", McLean Cooling Technology (2011).
"Weather Based Controller Bench Test Report," Metropolitan Water District of Southern California, Apr. 2004.
"Evaluation of Weather—Sensing Landscape Irrigation Controllers," University of California Cooperative Extension, Center for Landscape and Urban Horticulture, Jun. 2004.
"Weather and Soil Moisture Based Landscape Irrigation Scheduling Devices—Technical Review Report," US Department of the Interior, Bureau of Reclamation, Aug. 2006.
"Weather and Soil Moisture Based Landscape Irrigation Scheduling Devices—Technical Review Report, 2nd Edition" US Department of the Interior, Bureau of Reclamation, Aug. 2007.
Rain Bird, "Simple-To-Set Smart Controller Operation Manual" (2010).
Toro, "Evolution Series Controller User's Guide" (2013).
AquaConserve, "Product Specification" Residential/Commercial Controllers (2010).
AquaConserve, "Aqua Temperature and Rainfall Sensor RTS-2" (May 11, 2006).
AquaConserve, "ET-8 Series Manual" (2010).
AquaConserve, "ET-6, ET-9 and ET-14 Station Indoor Irrigation Controller User's Guide" (Jun. 2010).
AquaConserve, "ET-8B, 12B & 15B Indoor/Outdoor Irrigation Controller User's Guide" (Jul. 23, 2004).
AquaConserve, "ET-16SP-1, ET24SP-1, ET-32SP-1 Commercial/Industrial Controller in Stainless Steel Top Entry Enclosure User's Guide" (Jun. 2010).
AquaConserve, ET 16u-66u Station "Ultimo" Irrigation Controller User's Guide (Aug. 23, 2004).

\* cited by examiner

Extraterrestrial Radiation (RA) Expressed in Equivalent Evaporation (In mm/day)

| Jan. (1) | Feb. (2) | Mar (3) | Apr. (4) | May (5) | Jun. (6) | Jul. (7) | Aug. (8) | Sep. (9) | Oct. (10) | Nov. (11) | Dec. (12) | Latitude (degrees) (13) |
|---|---|---|---|---|---|---|---|---|---|---|---|---|
| (a) Northern Hemisphere ||||||||||||||
| 3.8 | 6.1 | 9.4 | 12.7 | 15.8 | 17.1 | 18.4 | 14.1 | 10.9 | 7.4 | 4.5 | 3.1 | 50 |
| 4.3 | 6.6 | 9.8 | 13.0 | 15.9 | 17.2 | 16.5 | 14.3 | 11.2 | 7.8 | 5.0 | 3.7 | 48 |
| 4.9 | 7.1 | 10.2 | 13.3 | 16.0 | 17.2 | 16.6 | 14.5 | 11.5 | 8.3 | 5.5 | 4.3 | 45 |
| 5.3 | 7.6 | 10.6 | 13.7 | 16.1 | 17.2 | 16.6 | 14.7 | 11.9 | 8.7 | 6.0 | 4.7 | 44 |
| 5.9 | 8.1 | 11.0 | 14.0 | 16.2 | 17.3 | 16.7 | 15.0 | 12.2 | 9.1 | 6.5 | 5.2 | 42 |
| 6.4 | 8.6 | 11.4 | 14.3 | 16.4 | 17.3 | 16.7 | 15.2 | 12.5 | 9.6 | 7.0 | 5.7 | 40 |
| 6.9 | 9.0 | 11.8 | 14.5 | 16.4 | 17.2 | 16.7 | 15.3 | 12.8 | 10.0 | 7.5 | 6.1 | 38 |
| 7.4 | 9.4 | 12.1 | 14.7 | 16.4 | 17.2 | 16.7 | 15.4 | 13.1 | 10.6 | 8.0 | 6.6 | 36 |
| 7.9 | 9.8 | 12.4 | 14.8 | 16.5 | 17.1 | 16.8 | 15.5 | 13.4 | 10.8 | 8.5 | 7.2 | 34 |
| 8.3 | 10.2 | 12.8 | 15.0 | 16.5 | 17.0 | 16.8 | 15.6 | 13.6 | 11.2 | 9.0 | 7.8 | 32 |
| 8.8 | 10.7 | 13.1 | 15.2 | 18.5 | 17.0 | 16.8 | 15.7 | 13.9 | 11.8 | 9.5 | 8.3 | 30 |
| 9.3 | 11.1 | 13.4 | 15.3 | 16.5 | 16.8 | 16.7 | 15.7 | 14.1 | 12.0 | 9.9 | 8.8 | 28 |
| 9.8 | 11.5 | 13.7 | 15.3 | 16.4 | 18.7 | 16.6 | 15.7 | 14.3 | 12.3 | 10.3 | 9.3 | 20 |

Fig. 2

Extraterrestrial Radiation (RA) Expressed in Equivalent Evaporation (In mm/day)

| Jan. (1) | Feb. (2) | Mar (3) | Apr. (4) | May (5) | Jun. (6) | Jul. (7) | Aug. (8) | Sep. (9) | Oct. (10) | Nov. (11) | Dec. (12) | Latitude (degrees) (13) |
|---|---|---|---|---|---|---|---|---|---|---|---|---|
| (a) Northern Hemisphere |||||||||||||
| 10.2 | 11.9 | 13.9 | 15.4 | 18.4 | 16.6 | 16.5 | 15.8 | 14.5 | 12.6 | 10.7 | 9.7 | 24 |
| 10.7 | 12.3 | 14.2 | 15.5 | 18.3 | 16.4 | 16.5 | 15.8 | 14.6 | 13.0 | 11.1 | 10.2 | 22 |
| 11.2 | 12.7 | 14.4 | 15.8 | 16.3 | 16.4 | 16.3 | 15.9 | 14.8 | 13.3 | 11.6 | 10.7 | 20 |
| 11.6 | 13.0 | 14.6 | 15.6 | 16.1 | 18.1 | 18.1 | 15.8 | 14.9 | 13.6 | 12.0 | 11.1 | 18 |
| 12.0 | 13.3 | 14.7 | 15.6 | 16.0 | 15.9 | 15.9 | 15.7 | 15.0 | 13.9 | 12.4 | 11.6 | 18 |
| 12.4 | 13.6 | 14.9 | 15.7 | 15.8 | 15.7 | 15.7 | 15.7 | 15.1 | 14.1 | 12.3 | 12.0 | 14 |
| 12.8 | 13.9 | 15.1 | 15.7 | 15.7 | 15.5 | 15.5 | 15.6 | 15.2 | 14.4 | 13.3 | 12.5 | 12 |
| 13.2 | 14.2 | 15.3 | 16.7 | 15.5 | 15.3 | 15.3 | 15.5 | 15.3 | 14.7 | 13.6 | 12.9 | 10 |
| 13.6 | 14.5 | 15.3 | 15.6 | 15.3 | 15.0 | 15.1 | 15.4 | 15.3 | 14.8 | 13.9 | 13.3 | 8 |
| 13.9 | 14.8 | 15.4 | 15.4 | 15.1 | 14.7 | 14.9 | 15.2 | 15.3 | 15.0 | 14.2 | 13.7 | 6 |
| 14.3 | 15.0 | 15.5 | 15.5 | 14.9 | 14.4 | 14.6 | 15.1 | 15.3 | 15.1 | 14.5 | 14.1 | 4 |
| 14.7 | 15.3 | 15.6 | 15.3 | 14.6 | 14.2 | 14.3 | 14.9 | 15.3 | 15.3 | 14.8 | 14.4 | 2 |
| 15.0 | 15.5 | 15.7 | 15.3 | 14.4 | 13.9 | 14.1 | 14.8 | 15.3 | 15.4 | 15.1 | 14.8 | 0 |

Fig. 2 (continued)

Extraterrestrial Radiation (RA) Expressed in Equivalent Evaporation (In mm/day)

| Jan. (1) | Feb. (2) | Mar (3) | Apr. (4) | May (5) | Jun. (6) | Jul. (7) | Aug. (8) | Sep. (9) | Oct. (10) | Nov. (11) | Dec. (12) | Latitude (degrees) (13) |
|---|---|---|---|---|---|---|---|---|---|---|---|---|
| \multicolumn{13}{|c|}{(b) Southern Hemisphere} |
| 17.5 | 14.7 | 10.9 | 7.0 | 4.2 | 3.1 | 3.5 | 5.5 | 8.9 | 12.9 | 18.5 | 18.2 | 50 |
| 17.6 | 14.9 | 11.2 | 7.5 | 4.7 | 3.5 | 4.0 | 6.0 | 9.3 | 13.2 | 16.8 | 18.2 | 48 |
| 17.7 | 15.1 | 11.5 | 7.9 | 5.2 | 4.0 | 4.4 | 6.5 | 9.7 | 13.4 | 16.7 | 18.3 | 46 |
| 17.8 | 15.3 | 11.9 | 8.4 | 5.7 | 4.4 | 4.9 | 6.9 | 10.2 | 13.7 | 16.7 | 18.3 | 44 |
| 17.8 | 15.5 | 12.2 | 8.8 | 6.1 | 4.8 | 5.4 | 7.4 | 10.6 | 14.0 | 16.8 | 18.3 | 42 |
| 17.9 | 15.7 | 12.5 | 9.2 | 6.6 | 5.3 | 5.9 | 7.9 | 11.0 | 14.2 | 16.9 | 18.3 | 40 |
| 17.9 | 15.8 | 12.8 | 9.6 | 7.1 | 5.8 | 6.3 | 8.3 | 11.4 | 14.4 | 17.0 | 18.3 | 38 |
| 17.9 | 16.0 | 13.2 | 10.1 | 7.5 | 6.3 | 6.8 | 8.8 | 11.7 | 14.6 | 17.0 | 18.2 | 36 |
| 17.8 | 16.1 | 13.5 | 10.5 | 8.0 | 6.8 | 7.2 | 9.2 | 12.0 | 14.9 | 17.1 | 18.2 | 34 |
| 17.8 | 16.2 | 13.8 | 10.9 | 8.5 | 7.3 | 7.7 | 9.6 | 12.4 | 15.1 | 17.2 | 18.1 | 32 |
| 17.8 | 16.4 | 14.0 | 11.3 | 8.9 | 7.8 | 8.1 | 10.1 | 12.7 | 15.3 | 17.3 | 18.1 | 30 |
| 17.7 | 16.4 | 14.3 | 11.6 | 9.3 | 8.2 | 8.6 | 10.4 | 13.0 | 15.4 | 17.2 | 17.9 | 28 |
| 17.6 | 16.4 | 14.4 | 12.0 | 9.7 | 8.7 | 9.1 | 10.9 | 13.2 | 15.5 | 17.2 | 17.8 | 26 |

Fig. 2 (continued)

Extraterrestrial Radiation (RA) Expressed in Equivalent Evaporation (In mm/day)

| Jan. (1) | Feb. (2) | Mar (3) | Apr. (4) | May (5) | Jun. (6) | Jul. (7) | Aug. (8) | Sep. (9) | Oct. (10) | Nov. (11) | Dec. (12) | Latitude (degrees) (13) |
|---|---|---|---|---|---|---|---|---|---|---|---|---|
| (b) Southern Hemisphere ||||||||||||||
| 17.5 | 16.5 | 14.6 | 12.3 | 10.2 | 9.1 | 9.5 | 11.2 | 13.4 | 15.6 | 17.1 | 17.7 | 24 |
| 17.4 | 16.5 | 14.8 | 12.6 | 10.6 | 9.5 | 10.0 | 11.6 | 13.7 | 15.7 | 17.0 | 17.5 | 22 |
| 17.3 | 16.5 | 15.0 | 13.0 | 11.0 | 10.0 | 10.4 | 12.0 | 13.9 | 15.8 | 17.0 | 17.4 | 20 |
| 17.1 | 16.5 | 15.1 | 13.2 | 11.4 | 10.4 | 10.8 | 12.3 | 14.1 | 15.8 | 16.8 | 17.1 | 18 |
| 16.9 | 16.4 | 15.2 | 13.5 | 11.7 | 10.8 | 11.2 | 12.6 | 14.3 | 15.8 | 16.7 | 16.8 | 16 |
| 16.7 | 16.4 | 15.3 | 13.7 | 12.1 | 11.2 | 11.6 | 12.9 | 14.5 | 15.8 | 16.5 | 16.8 | 14 |
| 16.6 | 16.3 | 15.4 | 14.0 | 12.5 | 11.6 | 12.0 | 13.2 | 14.7 | 15.8 | 16.4 | 16.5 | 12 |
| 16.4 | 16.3 | 15.5 | 14.2 | 12.8 | 12.0 | 12.4 | 13.5 | 14.8 | 15.9 | 16.2 | 16.2 | 10 |
| 16.1 | 16.1 | 15.5 | 14.4 | 13.1 | 12.4 | 12.7 | 13.7 | 14.9 | 15.8 | 16.0 | 16.0 | 8 |
| 15.8 | 16.0 | 15.6 | 14.7 | 13.4 | 12.8 | 13.1 | 14.0 | 15.0 | 15.7 | 15.8 | 15.7 | 6 |
| 15.5 | 15.8 | 15.6 | 14.9 | 13.8 | 13.2 | 13.4 | 14.3 | 15.1 | 15.6 | 15.5 | 15.4 | 4 |
| 15.3 | 15.7 | 15.7 | 15.1 | 14.1 | 13.5 | 13.7 | 14.5 | 15.2 | 15.5 | 15.3 | 15.1 | 2 |
| 15.0 | 15.5 | 15.7 | 15.3 | 14.4 | 13.9 | 14.1 | 14.8 | 15.3 | 15.4 | 15.1 | 14.8 | 0 |

Fig. 2 (continued)

| | 6540 Arlington Boulevard | Tel: 703-536-7080 |
|---|---|---|
| | Falls Church, VA 22042 | www.irrigation.org |

| Smart Water Application Technology™ (SWAT™) Performance Report |
|---|
| Testing Agency: Center for Irrigation Technology     www.californiawater.org |
| Product: Alex-Tronix Smart Clock® |
| Product Type: Climatologically Based Controller |
| Product Description: The Alex-Tronix Smart Clock® is a battery-operated controller with temperature and rain sensors. |
| SWAT™ Protocol*: Turf and Landscape Equipment Climatologically Based Controllers 7th Draft Testing Protocol (November 2006) |
| The concept of climatologically controlling irrigation systems has an extensive history of scientific study and documentation. The objective of this protocol is to evaluate how well current commercial technology has integrated the scientific data into a practical system that meets the agronomic needs of turf and landscape plants. The evaluation is accomplished by creating a virtual landscape subjected to a representative climate to evaluate the ability of individual controllers to adequately and efficiently irrigate that landscape. After initial programming and calibration the controller is expected to perform without further intervention during the test period. Performance results indicate to what degree the controller maintained root zone moistures within an acceptable range. If moisture levels are maintained without deficit, it can be assumed the crop growth and quality will be adequate. If moisture levels are maintained without excess it can be assumed that scheduling is efficient. |
| *All SWAT™ Protocol may be viewed at www.irrigation.org |

| Alex-Tronix Smart Clock® Controller SWAT™ Performance Summary | |
|---|---|
| Irrigation Adequacy | Irrigation Excess |
| Minimum of 6 test zones: 100% | Minimum of 6 test zones: 0% |
| Maximum of 6 test zones: 100% | Maximum of 6 test zones: 1.1% |
| Mean/Average of 6 test zones: 100% | Mean/Average of 6 test zones: 0.2% |
| Irrigation Adequacy represents how well irrigation met the needs of the plant material. This reflects the percentage of required water for turf or plant material supplied by rainfall and controller-scheduled irrigations. Research suggests that if this value is between 80% and 100%, the acceptable quality of vegetation will be maintained. | Irrigation Excess represents how much irrigation water was applied beyond the needs of the plant material. This reflects the percentage of water applied in excess of 100% of required water according to data from CIMIS station #80 Fresno State, Fresno County during the test period. |

| Product Detail Supplied by Manufacturer | | | | | |
|---|---|---|---|---|---|
| Alex-Tronix Smart Clock® | | | | | www.alex-tronix.com |
| Installation | Data Source | Data Link | Initial Purchase | Additional Hardware | Additional Fees |
| Replaces existing controller or is installed on a new system. | Tested with on site temperature sensor with optional rain sensor. | Hard wired | Purchase price includes temperature sensor. | ☐ Rain Switch Pole mount<br>☐ Rain and Temperature Sensors Pole mount<br>☐ Latching Solenoid<br>☐ Stainless Steel Pedestal mount | None |
| Additional Features | | | | | |
| Zones | Time of Day | Day of Week | Other | | If Data Link is Discontinued |
| Available with 6 zones | Capable of restricting the time of day for watering. | Capable of restricting watering days by selection or interval. | ☐ Multiple start times<br>☐ Programmable rain delay<br>☐ 5-yr Battery life with low battery indication | | Smart Clock may be used as a standard irrigation controller including percent adjust and 4 independent programs with multiple start times. |

FIG. 5A

| | 6540 Arlington Boulevard | Tel: 703-536-7080 |
|---|---|---|
| | Falls Church, VA 22042 | www.irrigation.org |

Smart Water Application Technology™ (SWAT™) Performance Report

| Testing Agency: Center for Irrigation Technology | www.californiawater.org |
|---|---|

Product: Alex-Tronix Enercon Plus

Product Type: Climatologically Based Controller

Product Description: The Alex-Tronix Enercon Plus is a pedestal mounted battery-operated controller with temperature and rain sensors.

**SWAT™ Protocol\*: Turf and Landscape Equipment Climatologically Based Controllers 7th Draft Testing Protocol (November 2006)**

The concept of climatologically controlling irrigation systems has an extensive history of scientific study and documentation. The objective of this protocol is to evaluate how well current commercial technology has integrated the scientific data into a practical system that meets the agronomic needs of turf and landscape plants. The evaluation is accomplished by creating a virtual landscape subjected to a representative climate to evaluate the ability of individual controllers to adequately and efficiently irrigate that landscape. After initial programming and calibration the controller is expected to perform without further intervention during the test period. Performance results indicate to what degree the controller maintained root zone moistures within an acceptable range. If moisture levels are maintained without deficit, it can be assumed the crop growth and quality will be adequate. If moisture levels are maintained without excess it can be assumed that scheduling is efficient.

\*All SWAT™ Protocol may be viewed at www.irrigation.org

Alex-Tronix Enercon Plus Controller SWAT™ Performance Summary

| Irrigation Adequacy | Irrigation Excess |
|---|---|
| Minimum of 6 test zones: 100% | Minimum of 6 test zones: 0% |
| Maximum of 6 test zones: 100% | Maximum of 6 test zones: 3.6% |
| Mean/Average of 6 test zones: 100% | Mean/Average of 6 test zones: 1% |
| Irrigation Adequacy represents how well irrigation met the needs of the plant material. This reflects the percentage of required water for turf or plant material supplied by rainfall and controller-scheduled irrigations. Research suggests that if this value is between 80% and 100%, the acceptable quality of vegetation will be maintained. | Irrigation Excess represents how much irrigation water was applied beyond the needs of the plant material. This reflects the percentage of water applied in excess of 100% of required water according to data from CIMIS station #80 Fresno State, Fresno County during the test period. |

Product Detail Supplied by Manufacturer

Alex-Tronix Enercon Plus — www.alex-tronix.com

| Installation | Data Source | Data Link | Initial Purchase | Additional Hardware | Additional Fees |
|---|---|---|---|---|---|
| Replaces existing controller or is installed on a new system. | Tested with on site temperature sensor with optional rain sensor. | Hard wired | Purchase price includes temperature sensor mounted within pedestal. | ❑ Rain Switch Pole mount<br>❑ Rain and Temperature Sensors Pole mount<br>❑ Latching Solenoid<br>❑ Lightning Protection | None |

Additional Features

| Zones | Time of Day | Day of Week | Other | If Data Link is Discontinued |
|---|---|---|---|---|
| Available in a base model of 4 zones; can control up to 24 by installing additional station modules in groups of 4. | Capable of restricting the time of day for watering. | Capable of restricting watering days by selection or interval. | ❑ Multiple start times<br>❑ Programmable rain delay<br>❑ 5-yr Battery life with low battery indication | Enercon Plus may be used as a standard irrigation controller including percent adjust and 4 independent programs with multiple start times. |

FIG. 5B

6540 Arlington Boulevard  
Falls Church, VA 22042  
Tel: 703-536-7080  
www.irrigation.org

Smart Water Application Technology™ (SWAT™) Performance Report

| | |
|---|---|
| Testing Agency: Center for Irrigation Technology | www.californiawater.org |
| Product: Alex-Tronix Universal Smart Module® (USM®) | |
| Product Type: Climatologically Based Controller | |
| Product Description: the Alex-Tronix Universal Smart Module attaches to any new or existing AC controller to make it SMART. (Tested with a Rain Bird SST controller and Hunter Mini-Clik rain switch.) | |
| SWAT Protocol*: Turf and Landscape Equipment Climatologically Based Controllers 8th Draft Testing Protocol (Sept. 2008) The concept of climatologically controlling irrigation systems has an extensive history of scientific study and documentation. The objective of this protocol is to evaluate how well current commercial technology has integrated the scientific data into a practical system that meets the agronomic needs of turf and landscape plants. The evaluation is accomplished by creating a virtual landscape subjected to a representative climate to evaluate the ability of individual controllers to adequately and efficiently irrigate that landscape. After initial programming and calibration the controller is expected to perform without further intervention during the test period. Performance results indicate to what degree the controller maintained root zone moistures within an acceptable range. If moisture levels are maintained without deficit, it can be assumed the crop growth and quality will be adequate. If moisture levels are maintained without excess it can be assumed that scheduling is efficient. | |

*All SWAT protocol may be viewed at www.irrigation.org

Alex-Tronix Universal Smart Module® SWAT™ Performance Summary

| Irrigation Adequacy | Irrigation Excess |
|---|---|
| Minimum of 6 test zones: 99.1% | Minimum of 6 test zones: 0% |
| Maximum of 6 test zones: 100% | Maximum of 6 test zones: 5.6% |
| Mean/Average of 6 test zones: 99.9% | Mean/Average of 6 test zones: 2.2% |
| Irrigation Adequacy represents how well irrigation met the needs of the plant material. This reflects the percentage of required water for turf or plant material supplied by rainfall and controller-scheduled irrigations. Research suggests that if this value is between 80% and 100%, the acceptable quality of vegetation will be maintained. | Irrigation Excess represents how much irrigation water was applied beyond the needs of the plant material. This reflects the percentage of water applied in excess of 100% of required water according to data from CIMIS station #80 Fresno State, Fresno County during the test period. |

Product Detail Supplied by Manufacturer

Alex-Tronix Universal Smart Module® (USM®)                    www.alex-tronix.com

| Installation | Data Source | Data Link | Initial Purchase | Additional Hardware | Additional Fees |
|---|---|---|---|---|---|
| An add-on module that works with a new or existing AC controller | Tested with on site temperature sensor with optional rain sensor. | Hard wired | Purchase price includes temperature sensor. | ❏ Rain Switch<br>❏ Temperature Sensor | None |

Additional Features

| Zones | Time of Day | Day of Week | Other | If Data Link is Discontinued |
|---|---|---|---|---|
| Will control up to 8 stations. | Controlled by host controller | Controlled by host controller | ❏ The module learns the peak demand schedule and makes adjustments based on day of year.<br>❏ 5-yr Battery life with low battery indication<br>❏ With temperature sensor, can suspend irrigation at owner designated temperature threshold. | The USM allows controller to operate at summer schedule until the link is re-established. |

FIG. 5C

DROUGHT WATERING RESTRICTIONS

All water users have been assigned a watering group. Mandatory restrictions mean you may only run sprinklers on your groups' allowed watering day(s). To locate your group, check your bill, visit snwa.com or call your water provider.

My assigned group:
_____

| Southern Nevada Water Authority Watering Group | Winter November - February | Spring / Fall March, April / September, October | Summer May - August |
|---|---|---|---|
| A | Monday | Monday, Wednesday, Friday | Any day |
| B | Tuesday | Tuesday, Thursday, Saturday | Any day |
| C | Wednesday | Monday, Wednesday, Friday | Any day |
| D | Thursday | Tuesday, Thursday, Saturday | Any day |
| E | Friday | Monday, Wednesday, Friday | Any day |
| F | Saturday | Tuesday, Thursday, Saturday | Any day |

For watering instructions, see inside panel.

[Prior Art]

FIG. 6A

Mandatory watering restrictions

* Assigned watering days are mandatory. Running your irrigation system outside of your assigned days is water waste and may result in a water-waste fee or citation. Report water waste at snwa.com.

* From May 1 until Oct. 1, sprinkler watering is prohibited from 11 a.m. to 7 p.m.

* Watering with a handheld hose and supervised testing of your irrigation system are allowed anytime. New landscapes may be watered as needed for 30 days.

HOW TO COMPLY IN 3 EASY STEPS

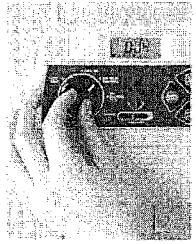

Adjust your watering clock seasonally: Sept. 1, Nov. 1, March 1 and May 1. Here's how:

1. Find your "watering days" function and adjust it to ensure it is only watering on your assigned day(s) each season.

2. Find your "start times" function and adjust it so you run 3 sprinkler watering cycles. Schedule cycles to be complete by sunrise in warm weather and during morning hours in cold weather.

3. For sprinklers, set your "run time" function to 4 minutes each cycle. Drip-irrigation needs vary; please see below. For more help setting your clock, visit snwa.com.

Sprinkler tips for grass

* On assigned day(s), schedule sprinklers to water 3 cycles a day, 4 minutes each watering. Run each cycle 1 hour apart. For help with rotating sprinklers, visit snwa.com.

* You may not need to water as often as mandatory restrictions allow. Increase watering only if you see widespread dry spots. Use a handheld hose for smaller dry areas.

* Bermuda and other warm-season grasses require about one-third less water than Tall Fescue grass.

* Don't water on windy or rainy days.

* Regularly check your irrigation system for broken or misaligned sprinkler heads and drip emitters.

Drip tips for plants

For plant health, drip systems should run LONGER than sprinklers because they deliver water MORE SLOWLY. Plants need water LESS OFTEN.

Visit snwa.com for tips on checking your emitters and determining the length of your watering cycle.

A single drip cycle of 30-90 minutes is recommended for plants, depending on emitter flow, plant types and soil. Drip irrigation should run less often than sprinklers. The SNWA recommends:

* 1 day a week in winter (Nov.-Feb.)
* 2 days a week in spring and fall (March-April, Sept.-Oct.)
* 3 days a week in summer (May-Aug.) Daily watering is not necessary.

Need help? Call 258-SAVE or visit snwa.com.

[Prior Art]

FIG. 6B

Dual Smart/Restrictions Use

COMPUTER SCREEN FOR CUSTOM AUTOMATED RESTRICTED WATERING SCHEDULES WITH OR WITHOUT SMART TECHNOLOGY AND DUAL SMART/RESTRICTED USE

WATER DISTRICT OR MUNICIPALITY: _____

YOUR ADDRESS NUMBER: _____

WATERING GROUP: (EVEN/ODD, A-F, ETC...) _____

DROUGHT STAGE (IF APPROPRIATE): _____

SPRING CALENDAR DATES:          FROM DD/MM TO DD/MM

ALLOWED WATERING TIMES DURING SPRING: FROM HH AM/PM TO HH AM/PM

SUMMER CALENDAR DATES:          FROM DD/MM TO DD/MM

ALLOWED WATERING TIMES DURING SUMMER: FROM HH AM/PM TO HH AM/PM

FALL CALENDAR DATES:            FROM DD/MM TO DD/MM

ALLOWED WATERING TIMES DURING FALL:  FROM HH AM/PM TO HH AM/PM

WINTER CALENDAR DATES:          FROM DD/MM TO DD/MM

ALLOWED WATERING TIMES DURING WINTER:  FROM HH AM/PM TO HH AM/PM

ALTERNATING USE AS A SMART OR RESTRICTED WATERING DEVICE

ENTER ZIP CODE: _____

USE AS A SMART DEVICE FROM:  DD/MM TO DD/MM

USE AS A RESTRICTED SCHEDULER FROM:  DD/MM TO DD/MM

| ENTER | | MODIFY | | DOWNLOAD |   DOWNLOAD VERIFIED

FIG. 15

LANDSCAPE IRRIGATION MANAGEMENT WITH AUTOMATED WATER BUDGET AND SEASONAL ADJUST, AND AUTOMATED IMPLEMENTATION OF WATERING RESTRICTIONS

This is a continuation of U.S. patent application Ser. No. 13/276,219 filed on Oct. 18, 2011, now U.S. Pat. No. 8,538,592, which is a continuation-in-part of U.S. patent application Ser. No. 13/159,071 filed Jun. 13, 2011, abandoned, which is a continuation in part of application Ser. No. 12/011,801 filed Jan. 30, 2008, now U.S. Pat. No. 7,962,244, which is a continuation in part of application Ser. No. 11/879,700 filed on Jul. 17, 2007, now U.S. Pat. No. 7,844,368, which is a continuation-in-part of U.S. Utility patent application Ser. No. 11/336,690 filed on Jan. 20, 2006, now U.S. Pat. No. 7,266,428, which is a continuation-in-part of U.S. Utility patent application Ser. No. 10/824,667 filed on Apr. 13, 2004, now U.S. Pat. No. 7,058,478, which claims the benefit of U.S. Provisional Application No. 60/465,457 filed on Apr. 25, 2003, all of which are incorporated herein in their entirety by this reference.

BACKGROUND OF THE INVENTION

1. Field of the Invention

The present invention relates to the management and conservation of landscape irrigation water and more specifically, to methods and apparatus for automatically adjusting irrigation based upon changing environmental conditions, geographic locations and/or government watering restriction regulations.

2. Description of the Prior Art

Many regions of the United States lack sufficient water resources to satisfy all of their competing agricultural, urban, commercial and environmental needs. Landscape water conservation has therefore become an important issue in the landscape irrigation industry. One reason that landscape water is over-utilized is that most consumers typically adjust their irrigation schedule an average of three times per year, rather than on a daily or weekly basis, regardless of changes in environmental conditions. The relatively high cost of labor in many municipalities prohibits frequent manual adjustments of such irrigation controllers. This generally results in over-irrigation and runoff, particularly during the off-seasons, oftentimes by as much as one to two hundred percent. Certain municipalities or water districts limit landscape irrigation to certain times of the day, certain days of the week, or certain days of the month. However, these require manually entered programming changes several times during the course of the year, resulting in generally limited compliance and efficiency. The Southern Nevada Water Authority (SNWA) recently reported that only 7% of their customers were totally compliant year round. It is therefore desirable to provide methods and apparatus for automatically adjusting landscape irrigation based upon changing environmental conditions, geographic locations and/or government regulations.

There have been three primary approaches used to accomplish the goal of conserving landscape irrigation water: (1) water conservation through restricted watering schedules (such as municipal or governmental watering restrictions); (2) soil moisture sensing methods; and (3) climate-based irrigation systems and methods using "smart" (self-adjusting) irrigation controllers.

Municipal watering restrictions have been used by municipalities for about 30 years to both save water and address the water load demand on pumping and infrastructure water delivery capacities. These restrictions have heretofore been manually entered into irrigation controllers and normally require manual seasonal changes. The present inventor's U.S. Pat. Nos. 7,844,368 and 7,962,244 and published application No. 2011/0093123, which are incorporated herein, discuss methods and apparatus for implementing municipally restricted watering schedules. These restrictions can be provided within an irrigation controller, through devices that are plugged into a controller, through devices that are added onto a controller, or through systems for centrally broadcasting information to remote controllers, add-ons or plug-ins. Additional embodiments for implementing restricted watering schedules are disclosed herein.

Soil moisture sensing devices have been in available for years, but have enjoyed only limited success. Such devices and methods generally call for inserting moisture sensors into the soil to measure the soil moisture content. Conventional soil moisture sensors typically break either the common electrical line to the valves, or break the electrical line for each individual valve. Irrometer provides such soil moisture sensors. Newer soil moisture sensing technologies have more recently been developed, such as by Acclima and Baseline, and claim to be more accurate in measuring plant water needs. Improved soil moisture technology may be promising, but such devices and methods are often problematic due to the location and number of sensors necessary, and the high costs of installing and maintaining the sensors. Nevertheless, newer and more accurate soil moisture sensing devices can provide useful data for use by "smart" (self-adjusting) irrigation controllers with which these newer sensors communicate, and related devices, including embodiments of the present invention.

In terms of climatologically based smart controllers, a number of irrigation controller manufacturers offer smart irrigation controllers that calculate evapotranspiration, or "ET", which is a representation of the amount of water needed by plants to replace water lost through plant absorption and evaporation, and is expressed in inches or millimeters of water per day. Unfortunately, as described briefly below and in more detail in predecessor U.S. Pat. No. 7,058,478 (which is incorporated herein by this reference), because there are so many different methods of calculating ET, and because so many different variables may be taken into consideration in making ET calculations, any controller or related device that actually performs ET calculations is likely to generate erroneous or unpredictable results, which is not desirable when trying to regulate landscape irrigation.

The United States Food and Agriculture Office (USFAO), in its Irrigation and Drainage Paper No. 24, entitled "Crop Water Requirements," noted that "a large number of more or less empirical methods have been developed over the last fifty years by numerous scientists and specialists worldwide to estimate ET from different climatic variables."

There are at least 15 different ET formulas. Each of these formulas provides a different result for the reference ET (ETo). In their paper entitled "Methods to Calculate Evapotranspiration: Differences and Choices," Diego Cattaneo and Luke Upham published a four-year analysis comparing four different recognized ETo formulas—the Penman-Monteith formula, the Schwab formula, the Penman formula, and the Penman program described in the previous patents. The comparison revealed that the results from these four recognized formulas sometimes varied by as much as seventy percent, particularly with the most recognized Pennman-Monteith formula discussed at length in the parent applications. (See the '478 patent col. 2, starting at line 56; and see the '428 and '368 patents, FIG. 8; and see FIG. 8 of the pending published application 2011/0093123). The following U.S. patents, among others, disclose various methods by which an irrigation controller calculates or adjusts an irrigation schedule based upon historical, distal, or local ETo: U.S. Pat. Nos. 4,962,522; 5,208,855; 5,479,339; 5,696,671; and 6,298,285. Unlike embodiments of the present invention, all of these inventions either calculate ETo ("reference" ET) values from weather stations or environmental sensors, or receive current service based ET data from external sources, and use such ET information to adjust and regulate irrigation. Several of these existing inventions also utilize other data, such as a precipitation sensor or a freeze sensor to shut down irrigation, respectively, during rainy times or cold temperatures. None of these prior inventions, however, actually perform an automated water budget calculation. Conversely, embodiments of the present invention do not themselves make any ET determinations or calculations, and do not receive or transmit current ET data; however, embodiments of the present invention may utilize or rely on historical ET data in determining the water budget percentage without making ET calculations within the embodiments. Such external sources may be California Irrigation Management Information System (CIMIS) ET databases, local sensors, cable lines or broadcast stations. Such historical ET data was used to develop FIG. 1 of the parent patents and the pending published application 2011/0093123.

The main objection to using ET based controllers, add-ons and plug-ins is that they either calculate ET or receive ET data in order to determine the irrigation schedule and are far too complex for the average user. A 2009 study sponsored by the California Department of Water Resources (DWR) conducted by AquaCraft revealed that of the 3112 ET based smart irrigation controllers used in the California study, 47% used more water than the previous conventional controllers at the same locations during the previous year. The total resulting overall average landscape water saved was a disappointing 6.3%. As a consequence, many irrigation controller manufacturers such as Toro, Irritrol, Rain Bird, and Hunter have recently gone away from calculated ET based systems and transmitted ET based service fees, particularly for residential applications, in favor of much simpler and less expensive approaches.

In addition to its user unfriendliness, a second shortcoming of the calculated ET method is its dependence upon numerous categories of local, real-time meteorological data and a variety of landscape specific data such as the sprinkler precipitation rate, crop coefficient factors, type of soil, slope, degree of shade, etc.

Data used for calculating current ET must be obtained by separate sensors, each one installed in a particular location, requiring an understanding of local environmental conditions and meteorology. Such current data must be received and processed in real-time, and any inaccurate, misinterpreted or misunderstood data would result in inaccurate current ET calculations, leading to potential deviations and inefficient irrigation. Historical ET, however, averaged over time, is less susceptible to such deviations.

Due to the urgency arising from severe national drought and environmental conditions, and the shortcomings of the various present technologies, the irrigation industry is still, as it was in 2003, researching alternative methods for water conservation and prevention of unattended runoff. The Center for Irrigation Technology in Fresno, Calif., along with other educational and research institutions and water conservation agencies, is conducting studies to determine the most effective water conservation method. On the national level, the EPA is in the final stages of implementing a "WaterSense" irrigation efficiency rating program similar to the "EnergyStar" rating system currently in use for equipment energy efficiency. The purpose of such an irrigation efficiency rating program is to promote consumer awareness and compliance as an alternative to mandated water conservation measures which would severely and negatively impact the irrigation industry, landscape aesthetics and the ecology. The main criteria for WaterSense labeling is passing the SWAT test while producing at least a 20% landscape water savings, and the capability to incorporate restricted watering schedules. However, there is no specification or means provided for any form of changes to automate watering restrictions during the course of the year, nor the ability to select from one or more set of watering restrictions, including the incorporation of stages of drought.

It is clear from the foregoing discussion that the landscape irrigation industry, in view of a politically and economically sensitive, and urgent, water crisis, is pursuing highly scientific, mathematical and/or technical approaches for resolving the problems of wasted irrigation water and drought conditions. Unsurprisingly, such approaches have met with limited success in a decade of use. The EPA, United States Department of Energy (DOE), ecologists, environmentalists, municipalities, water agencies, and research institutions are all searching for new methods that provide practical (as opposed to theoretical) irrigation efficiency—methods that overcome the particular shortcomings of the prior art.

Thus, there is an urgent need for irrigation systems that conserve water and energy, and minimize negative impact upon the environment, by automatically adjusting their schedules periodically in response to meteorological and seasonal changes, as well as complying with any governmentally-mandated watering restrictions.

The problem of irrigation mismanagement, and the main hurdle faced by the industry, can be simply summarized as follows: once a system is properly designed and installed, most of the wasted landscape irrigation water and runoff is caused by failing to adjust irrigation based on daily, periodic, or seasonal weather changes. Such inaction is usually caused by the complexity and difficulty of determining the particular adjustment amounts. With that in mind, correspondingly simple intuitive solutions would be highly preferred over the existing highly theoretical and technical, but impractical, state of the art in moisture sensing or ET-based control systems.

It is therefore desirable to provide simple, user-intuitive, and therefore readily acceptable water conservation approaches, particularly for clearly understood automated methods of adjusting and implementing irrigation schedules. It is further desirable to provide methods and apparatus that do not necessarily rely upon ground or air moisture sensing means, weather stations, or performing ET calculations (either directly, or as a basis for deriving watering times). It is further desirable to provide methods and apparatus that minimize the margins and sources of errors by minimizing the number of sensor inputs required by the variables in whatever formula is used. It is further desirable to provide methods and apparatus that utilize minimal local, real-time meteorological data. It is further desirable that such methods and apparatus be cost-efficient, affordable and usable by a large number of people and entities within the different industries. It is further desirable that such methods and apparatus be understandable by the average consumer. It is further desirable that such methods and apparatus be accomplished automatically, without requiring regular manual adjustments by the operator of the irrigation watering time settings or schedules. It is also desirable to provide either as an alternative or in combination automated implementation of governmental watering restrictions along with simple automated water budget or seasonal adjust functionality.

SUMMARY OF THE INVENTION

The present invention automates the water budget or seasonal adjust feature of irrigation controllers alone or in various combinations with automated watering restrictions to conserve landscape water. The result is a greatly simplified approximation of evapotranspiration methods without the need to calculate evapotranspiration within any of the preferred embodiments of the present invention. The present invention provides numerous automated methods and apparatus for smart water conservation and management alone or in combination with automatic implementation of governmental or other watering restrictions in controllers, add-ons, plug-ins, central systems or other devices.

Embodiments of the smart irrigation methods and apparatus described herein determine or calculate a water budget percentage to be applied, for example, to a peak or summer irrigation schedule, by comparing stored to current geo-environmental data, and then apply the percentage to an irrigation schedule to adjust a controller's station start times, run times, watering intervals, or otherwise alter the controller's irrigation schedule. In embodiments of the invention, governmental or other watering restrictions for a particular location are automatically selected and implemented, and automatically re-selected or updated for automatic seasonal calendar changes. Both automatic water budgeting and automatic implementation of restricted schedules may be provided in many of the embodiments herein to accommodate for available water supply and infrastructure pumping and delivery limitations for a water district, municipality, or region. In some embodiments restricted watering schedules may be automatically implemented at some times during the year, but not implemented at other times during the year, thereby allowing whatever smart technology is present in the controller, add-on, plug-in, or system, whether water budgeting, ET-based, soil moisture based, or other, to adjust watering during those other times.

Various terms used in the present application are defined in advance for clarity:

1. A "smart" weather or climate based irrigation system is one that self-adjusts its watering schedule(s) or station run time(s) periodically to adapt to current weather conditions or other input. The use of water budget percentages is an example of "smart" irrigation technology. ET and soil moisture based technologies are other examples of smart controllers.
2. A "conventional" irrigation controller does not have smart technology and may also be referred to as an existing controller.
3. "Seasonal adjust" is a feature available in irrigation controllers that allows the operator to manually set or change all of the controller station run times globally by a percentage of the original time settings so that each individual station run time does not have to be separately changed. It is also convenient for the homeowner or operator to not have to remember or record the original station run times. Usually reverting the water budget to 100% will reset all station run times to their original settings.
4. The term "water budget" or "water budget ratio" (WBR) is a percentage of an original or preliminary watering station run time. These terms are used numerous times in the parent patents. The suffix "ratio" is sometimes used to clarify that this does not refer to a budgeted volume or allotment of water. In this context, "water budget", "water budget ratio" and "water budget percentage" are often used synonymously. Embodiments of the present invention similarly automate the "seasonal adjust" feature using a water budget ratio—without actually determining or calculating ET—by comparing current environmental data to stored environmental data for the controller location, hence called geo-environmental data. Any reference to the water budget ratio as being calculated or determined is not to be inferred as to any specific equation, algorithm or certain variables. The equations or algorithms used in the exemplary water budgeting methods and apparatus of the present invention are merely considered as one of the many methods and apparatus available, but are not the only equations, algorithms, variables or physical embodiments possible. An important aspect of embodiments of the present invention is the automation of the water budget and its use to adjust either the preliminary station run times, start times or watering schedules (such as watering intervals) as previously noted in the parent patents.
5. An "irrigation schedule" refers to a controller's programmed schedule of start times, watering days, and/or station durations (run times).
6. A "restricted irrigation schedule" refers to restricted, allowed, or not allowed watering days of the week, days of the month, or times of the day, as set by a governmental entity or other authority. Embodiments of the present invention automate such restricted schedules.
7. Station "run times" are part of an irrigation schedule. Hence varying station run times is varying a specific part of varying an irrigation schedule. Varying, modifying, or adjusting an irrigation schedule is more general, hence broader, and may include varying station run times, start times, watering days, or watering intervals, or any combination thereof.
8. "Stored" or "historical" geo-environmental data may consist of ambient temperature, solar radiation, relative humidity, wind, precipitation, ET, soil moisture or temperature data, or combinations thereof. Historical or stored ET data is not calculated or determined by or within any embodiments of the present invention, but may be provided to, stored into, and used by embodiments of the methods or apparatus of the present invention.
9. One group of landscape water conservation methods and apparatus of the present invention are called "temperature budgeting" because in their simplest and preferred forms, these embodiments only require current temperature sensor data and some historical data to determine a water budget.
10. "Time of Use" (TOU) is a term used by electric utilities starting in the early 1990's for rewarding farmers who did not use their agricultural pumps during peak hours of the day with significant energy rate reductions.
11. A distinction is made between a "plug-in" type of device, and an "add-on" device. Both are technically add-ons because they are both added to existing controllers, for example to make them smart and/or to comply with watering restrictions. The "plug-in" version of an add-on generally plugs into a controller so that it can communicate directly with the microprocessor of the controller. Thus, a "plug-in" can only communicate with certain models of a host controller. A simple "add-on" is normally attached to one or more of the outputs of a controller to interrupt or modify or adjust such outputs according to its programming.
12. SWAT (Smart Water Application Technology) is a testing protocol for smart irrigation controllers. The EPA WaterSense labeling program and the Irrigation Industry have accepted the SWAT test as the standard for verifying landscape water conservation.
13. A central unit or module (CM) is a unit that includes a microprocessor that is capable of determining a water budget, and an output to send this information to one or more remotely located controllers, plug-ins or add-ons. The output may use a transmitter, wireless system, internet connection, or other dissemination device. The remote units may or may not be independently addressable by the CM. A CM may in turn be in communication with one or more environmental sensors by wired or wireless means. A CM may also send (governmentally) restricted watering schedules. A typical CM may cover a local area such as a school, park, apartment complex, shopping center or a cemetery; or it may broadcast to an entire neighborhood, subdivision, city, county or other geographic region.
14. "Historical ET data" refers to evapotranspiration (ET) data for a geographic location that has already been calculated according to one or more known ET formulae. Such data may be used by embodiments of the present invention, but no ET calculations are actually performed by any embodiment of the present invention.
15. "Non ET" means that ET is not calculated within any embodiment of the present invention, nor is current ET received by any embodiment of the present invention. Historical stored ET data is not calculated within any of the embodiments, however its use is not excluded from the preferred embodiments of the present invention, nor its parent applications. FIG. 1 of the '478, '428, and the '368 patent and the pending '839 application all show the potential use of historical ET data to determine a water budget percentage.
16. Watering "restrictions" are watering times of the day, days of the week, or days of the month when landscape irrigation is allowed or not allowed.

Embodiments of the present invention utilize one or more of the following simple and effective automated implementations for landscape water conservation: (1) automation of governmentally restricted watering schedules; (2) automation of water budgeting within a controller, a plug-in or an add-on using periodic water budget ratios that are obtained without performing any ET calculation within the embodiments; and/or (3) automation of both governmental restrictions and water budgeting for maximum flexibility to accommodate local water supply and infrastructure needs. The latter may include automatically switching between smart technology (including water budgeting or any other smart technology) to restricted watering schedules during the course of the year.

Automated Watering Restrictions

Municipally or governmentally mandated watering restrictions have been around for decades in one form or another. For example, certain odd or even home addresses can only water during even or odd days of the month. Another example is that even addressed residences can water on Mondays, Wednesdays, and Fridays, while odd addresses can water on Tuesdays, Thursdays or Saturdays. Also, watering restrictions may limit irrigation to certain times of the day to minimize evaporation. A specific example of watering restrictions that is mandated by the Southern Nevada Water Authority (SNWA) has been discussed at length in parent U.S. Pat. Nos. 7,844,368 and 7,962,244 and shown in FIGS. 6a and 6b herein as the SNWA (Southern Nevada Water Authority) "Drought Watering Restrictions". However, as noted in these figures, allowed or not allowed time and day restrictions change several times during the course of each year to accommodate expected seasonal conditions, thereby requiring local users to manually reprogram their controllers to comply with these changes. It is to be appreciated that watering restrictions are not necessarily limited to those imposed by a municipality or governmental entity, and that any restrictions imposed by any public or private authority are within the scope of embodiments of the present invention.

The following are non-limiting examples of automation of restricted watering schedules as provided in embodiments of the present invention:
1. A schedule of governmentally or otherwise restricted/allowed watering times entered by the user into a controller. This schedule may be manually entered, received over the internet, downloaded into the irrigation controller using a USB port or a memory stick like device, or by wireless (WIFI) means, or displayed on a screen so that the user merely has to select the appropriate restrictions without having to enter any data on the screen. The user then enters the geographic location of the controller, (which may be automatically determined as part of the input of the governmental restrictions) by entry of a zip code, or the like. In many embodiments, once the geographic location is entered or determined, the embodiment also automatically programs the controller for smart watering using a water budgeting method. The controller may then be placed in communication with at least one environmental sensor to receive input used in performing periodic WBR calculations. The user can then select whether he wants to do automated water budgeting, restricted watering schedules, or a combination of both. The programming in the controller may then prevent watering on non-allowed days, and/or adjust watering (adjust start times or run times) according to the according to an applicable restricted watering schedule and/or periodically determined WBR.
2. Governmental or other watering restrictions may be programmed or downloaded into a portable module, along with historical environmental data for a geographic location. The module is then plugged into a host controller providing it with the watering restrictions and/or historical data for that location (such as temperature, solar radiation, relative humidity, wind, historical ET, etc.). Either the controller or the plug-in is placed in communication with at least one environmental sensor to receive input used to perform periodic WBR calculations. The user may then select either automated watering restrictions, automated water budgeting, or both.
3. Governmental or other watering restrictions could be provided from a central unit that sends both watering restrictions and/or the periodic (e.g. daily) water budget percentage (WBR) to local controllers. The controllers then use the data received to prevent watering and/or adjust their watering schedules.
4. Governmental or other watering restrictions are input or downloaded into a portable module, along with historical environmental data for a geographic location. The module is then attached to the output of a host controller and to at least one environmental sensor to receive input used to perform periodic WBR calculations. The user may then select either automated watering restrictions, automated water budgeting, or both. The module then cuts off irrigation when not allowed according to the governmental restrictions and/or limits irrigation according to the WBR.

Local water authorities recognize that water conservation may be accomplished by imposing watering restrictions, or the use of simple smart controllers as an alternative by offering rebates and customer education programs. Currently, without automation of either watering restrictions or smart technology, such authorities rely on voluntary compliance with watering restrictions through manual adjustment of irrigation controllers to account for daily or seasonal changes. It is expected that automatic implementation of these restrictions through embodiments of the present invention will be more convenient for users, will result in greater compliance, and will therefore greatly increase the conservation of water.

One unique aspect of embodiments of the present invention is the automation of the restricted watering schedules throughout the year, and in some embodiments this feature is combined with smart automated temperature budgeting or other smart technology to satisfy the recently proposed EPA WaterSense requirements. These automated features can be provided through embodiments within the controller, supplied by a plug-in module, or by an add-on, with or without temperature budgeting capability or some other ET or soil moisture based technology. The SNWA recently completed a study of 357 devices and controllers that automated their watering restrictions to improve customer compliance. The results indicate nearly a 90% satisfaction from the users and a 13% overall landscape water savings over a two year study period. This study was undertaken because ET based controllers have not been effective in terms of acceptance or reported water savings.

Time of use watering restrictions are sometimes referred to as "allowed" watering times or inherently "not allowed" watering times. Automation of watering restrictions are provided through several embodiments of the present invention. Methods and apparatus for automating watering restrictions combined with automating water budgeting are disclosed within the present application in embodiments that include without limitation controllers, add-ons, plug-ins and central broadcast/receiver systems.

Automatic implementations of time of use restrictions provided in the form of add-on devices are described in parent U.S. Pat. No. 7,962,244 which is incorporated herein by this reference. Pending application Ser. No. 13/159,071 which is also incorporated herein by this reference discloses automation of such restrictions within controllers. The abstract of the '244 patent provides: "Embodiments of the invention also provide methods and apparatus for updating the local watering restrictions and integrating the present invention into existing controllers." Col. 7, lines 11-15 of the '244 patent provides: "In other embodiments, the watering schedules of the local governmental authority may be incorporated with a new controller (conventional or smart) without the need for an external module to override the controller's programmed watering schedules." In addition, FIG. 8 of the '244 patent shows a new conventional or smart controller with time of use programming. Automatic implementation of restricted watering schedules may also be accomplished with a specific type of add-on called a plug-in. This device is in communication with the existing controller microprocessor and provides it with the restricted watering schedules to be implemented by the controller.

Other embodiments of automated watering restrictions may be implemented into a controller itself, as described in the '244 patent and in pending application Ser. No. 13/159,071, incorporated herein. The embodiments of the irrigation controllers of the present invention may be provided in a commercially available device having the following components: a means for an operator to enter data into the controller (such as a keyboard, touch screen, dial, magnetic card readers, input port, internet connection or remote device) and a microprocessor. In some embodiments, the input and display of the controller may be used to input one or more restricted watering schedules. In other embodiments the restricted watering schedules may be downloaded into the controller add-on or plug-in. A means may be provided for selecting from multiple schedules such as without limitation:

1. Each restricted watering schedule may be stored within the controller microprocessor and represented numerically. The operator may consult his owners' manual or go to a designated web site, enter his water district or city and enter that numerical schedule into the controller. The controller can then determine which internally preprogrammed schedule to access and implement.
2. Restricted watering schedules may be developed by accessing an internet site where the allowed watering days, times of day, seasonal changes, drought stages, even or odd street addresses, or watering groups may be programmed onto the computer screen and downloaded directly or through a portable device such as a flash memory stick or the like, and entered into the controller, add-on or plug-in. (See FIG. 15) In some embodiments of the invention, restricted watering schedules may be sent from a central location to remote controllers, add-ons or plug-ins either wirelessly or via the internet. During the course of irrigation during the year, the controller only allows irrigation to occur during the allowed watering times of the day, day or the week, day of the month, etc.

Other embodiments implementing restricted watering schedules are provided by a central system, which may be local, city wide, county wide, etc. Each controller may be given an address which the central system uses to send the automated restricted watering schedules to such controllers. Certain controllers, for example, are addressed to water on certain days of the week, or certain times of the day, or certain days of the month. Other controllers are addressed to water on other days of the week, or at other times, etc. In related embodiments, seasonal changes in watering restrictions are also automatically implemented, and/or water budgeting may also be automatically implemented.

Automated Seasonal Adjust or Water Budgeting.

As first set forth in parent U.S. Pat. No. 7,058,478 (col. 7, lines 31-38) and subsequent patents and pending applications, preferred methods and apparatus for water budgeting rely on the following universally understood concepts: (1) more water is required to irrigate landscape or crops during periods of warmer temperatures; (2) less water is required during periods of cooler temperatures; (3) little or no water is required or desired below a certain temperature, or during certain times of the year; (4) little or no irrigation water is required while it is raining or cold, and for a period thereafter.

In embodiments that use temperature budgeting within an irrigation controller, the operator first attaches the controller to an irrigation system. This can be done at any time of the year, not merely during the summer months. In an example of preferred and simple embodiments of methods and apparatus, the user installs a temperature sensor or one or more additional sensors within the target geographical area, and initiates its communication between the sensor(s) and the controller. For example, an optional readily available rain sensor may also be installed, and placed in communication with the controller. The user then programs an exemplary controller with an irrigation schedule (preferably the summer or peak schedule) using personal experience, professional assistance, with internet provided guidelines, or by other means.

If not already present, the time and date are entered into the exemplary controller. Then, the physical location of the controller is entered, for example by providing the local zip code. This compares to the more complicated need to provide ET based controllers with information such as precipitation rates, soil type, slope, crop coefficient factors, system efficiency, and degree of shade or sun to calculate the preliminary irrigation schedule, and multiple sensors or a weather station, or a monthly service fee for ET data. The preferred temperature budgeting methods and apparatus of the present invention do not use any form of ET, while other embodiments discussed more fully below may use historical ET.

Once the zip code or other geographic location information is entered in these exemplary temperature budgeting embodiments, in preferred embodiments, the controller then automatically determines the extraterrestrial radiation factor (RA) for the standard date and location from a look-up table stored within the controller. The RA utilized by this invention must be distinguished from the solar radiation value (Rn or Rs) provided by weather stations and sensors, and utilized by ETo formulas. Specifically, RA is a function of the angle at which the sun strikes the earth at various times of the year at various latitudes, expressed as virtual evaporation in units of milliliters of water (the same units of measurement as ET) while solar radiation is a measure of the actual intensity of sunlight at a particular time. In other embodiments, the controller may look up other historical environmental data, such as historical ET, and use it in a way that is similar to the way RA is used.

It is to be appreciated that a primary object of water budgeting is to obtain a ratio or percentage by which a controller watering schedule may be adjusted. Thus, any suitable determination or set of calculations that results in such a ratio is within the scope of the present invention. By way of example, and without limitation, in this temperature budgeting example, the controller first automatically calculates a standard temperature budget factor (STBF) using data provided by the operator (e.g., the July average summer high temperature, and the latitude; or by the use of a zip code or other location identifier that identifies the latitude and historical average summer high temperature), and using any number of relatively simple formulas utilizing this data. As described in greater detail in the parent patents, one method of calculating the STBF is to multiply the high summer temperature (either provided by the operator or by the entered zip code) by an RA (the RA determined by the particular geographic location of the controller, and either the estimated date of the summer high temperature or the average summer RA values for the particular geographic location). The STBF is then stored for subsequent use in determining the water budget ratio (WBR) percentage. It is to be appreciated that no ET calculation is performed here, although in other embodiments, historical ET data may be used instead of RA data.

In this non-limiting example, the controller may also obtain the actual high temperature and RA for the particular current period, the former from a temperature sensor and the latter from an internal look-up table or other suitable source. Such periodic (current) data is used to calculate the periodic temperature budget factor (PTBF). The PTBF should be calculated utilizing the same formula for calculating the STBF, but using currently available data rather than the data initially provided by the operator. The controller then computes the WBR by dividing the PTBF by the STBF. This ratio is then used to adjust the preliminary irrigation schedule or run times for that particular period. It is to be appreciated that variations on these calculations of STBF and PTBF are within the scope of the present invention, and/or other or different calculations may be performed to obtain the desired water budget ratio (percentage). It is also to be appreciated that no ET calculation is performed in developing the water budget ratio.

Once the WBR has been determined, the preliminary irrigation schedule may be multiplied by the WBR to obtain the modified (actual) irrigation schedule. The controller then irrigates the irrigation area pursuant to the modified irrigation schedule, as described in greater detail herein (e.g., changing station run times and/or start times and/or schedules). It is to be appreciated that these particular examples of temperature budgeting embodiments of the invention do not require, use or calculate any form of ET information. However, other embodiments of the present invention may use other historical data, including historical ET data, without calculating ET within the embodiments of the present invention, to determine the water budget percentage. The present invention is not to be limited by any particular equation, nor any variables used within any equation in determining the water budget or water budget ratio It is to be appreciated that temperature budgeting may also be implemented in other embodiments of the present invention including without limitation add-ons, plug-ins, central (broadcasting) systems, and/or other similar systems.

Because embodiments of the present invention relationally adjust an irrigation schedule, they are suitable for nearly all conditions and locations. Embodiments of the present invention can compensate for numerous characteristics and specifications of an existing irrigation system, and unlike prior systems, these embodiments do not require multiple complicated formulas or variables. Embodiments of the present invention can also inherently compensate for particular environmental conditions. For example, they may be applied to the "cycle and soak" method commonly utilized for sloped landscapes, since they increase or decrease the initial irrigation schedule for the sloped landscape based upon the WBR.

It is once again to be appreciated that the specific algorithm and parameters used in determining the WBR while performing temperature budgeting represent only some embodiments of the invention. Other algorithms, equations, or parameters may be used to calculate the WBR, as described more fully elsewhere herein, and the appended claims are not to be limited to any examples of calculating a water budget percentage.

The present methods and apparatus for adjusting an irrigation schedule may be used year-round, and at any geographic location. For example, in the northern hemisphere, the winter PTBF will typically be much lower than the STBF, resulting in a much lower WBR value. This in turn significantly decreases the irrigation duration, which is consistent with the average consumer's understanding that irrigation is not as necessary during the winter months. When the operator inputs a minimum temperature and utilizes the precipitation sensor, embodiments of the present invention are able to completely cease irrigation during unnecessary periods.

Alternative embodiments of an apparatus of the present invention provide an add-on temperature budgeting or alternate automated water budgeting module. This add-on module is placed along the output path of an existing irrigation controller, so that it intercepts and processes any signals from the controller to the irrigation system. This module determines the WBR in the same way(s) as in the above-described irrigation controller embodiments, and permits the operator to add the features and functions of the present invention described herein to any existing irrigation controller without replacing the old controller entirely.

Other embodiments of an apparatus of the present invention are implemented using a plug-in module provided with environmental sensor data. The plug-in is also provided with historical data for the selected geographic region. The plug-in then periodically (preferably daily) calculates a water budget ratio using the methodology described elsewhere herein. A microprocessor in the plug-in module then communicates this periodic (e.g., daily) water budget to the controller microprocessor which can easily access its existing watering schedules and adjust the summer or preliminary irrigation schedule station run times accordingly. This communication with the host controller can be hard wired or wireless. The environmental sensor(s) can be as simple as a temperature sensor, or a combination of sensors such as without limitation solar radiation, wind, soil moisture, relative humidity, and temperature.

Power for the various embodiments described herein may be from AC power, from a solar panel, batteries, or ambient light.

Optional features may also be incorporated into embodiments of the present invention. For example, the operator may specify a minimum irrigation temperature. This insures that the irrigation schedule is not activated when the temperature is near or below a certain point, such as freezing temperature. Such a minimum temperature requirement serves two primary purposes—first, to conserve water, and second, to protect the safety of vehicles and pedestrians traveling through the irrigation zone during freezing temperatures. A second optional feature permits the operator to further adjust the irrigation schedule according to the particular circumstances and/or limitations, such as the water delivery method utilized by the irrigation system, the specifications of the system, or the type of plants being watered. This allows the operator to fine-tune the irrigation schedule based upon personal experience, observations or unusual field situations. A third optional feature is to provide a commonly available precipitation sensor in communication with the embodiment of the invention, either directly or indirectly as a separate unit (e.g., through a physical hard-wired connection, a wireless connection or radio transmission; or as a component built into an irrigation controller), so that the embodiment may detect, for example, the occurrence of rainfall and suppress the irrigation schedule during the affected periods. The particular effect of current or recent precipitation upon the irrigation schedule may be determined by the operator. For example, the operator may cause the embodiment to suppress the irrigation schedule if precipitation occurred within the previous twenty-four hours, or only if precipitation is occurring at the particular moment of irrigation. Additionally, direct input into the controller, plug-in or add-on microprocessor may allow for adjustment of the irrigation delay period depending upon the amount of rainfall or the intensity of rainfall. A hygroscopic rain switch or a "tipping bucket" type of rain sensor may be provided by wired or wireless means in addition to one or more environmental sensors. The rain delay irrigation shutdown may be adjustable within the controller, add-on or plug-in depending upon the duration of the rainfall, amount of precipitation, or intensity of the precipitation.

As an alternative to water budgeting based on temperature sensor information, other methods and apparatus contemplated by the present invention to conserve landscape irrigation water may utilize soil moisture sensors to automate the water budget feature. Soil moisture sensors that merely break the line to one or more valves are not within scope of the present invention. However, newer soil moisture sensors may be used instead of (or in combination with) temperature or other environmental sensors in embodiments of the present invention to provide data used to calculate WBR and adjust the station run times or irrigation schedules. As with other embodiments, a water budget percentage is determined in these embodiments by comparing current geo-environmental data (e.g., data received from a soil sensor) to stored geo-environmental data without determining or calculating ET.

For example, assuming that soil moisture sensors are installed remotely in a landscaped area, these sensors could provide data such as soil temperature or soil moisture data from a certain location. This data is current or real time geo-environmental data. Historic data consisting of soil moisture and soil temperature data is stored within the controller. A minimum and maximum root zone watering threshold is established within the controller microprocessor. When the historic geo-environmental data is compared to current geo-environmental data, a percentage of the previously set station watering run time may be required to replenish the root zone for that location to reach the maximum threshold level.

It is therefore an objective of the present invention to provide simple and straightforward methods and apparatus for irrigation water conservation, that are naturally intuitive such that they may be used by a wide variety of people or entities in different circumstances encompassing automated implementation of water budgeting and automated implementation of governmentally restricted watering schedules.

It is another objective of the present invention to offer a choice of automated smart water budgeting or automated watering restrictions, or both, with the additional ability to select from one or more such automated restricted schedules.

It is another objective of the present invention to provide methods and apparatus for conserving water by automatically adjusting irrigation schedules in response to varying climatic conditions.

It is another objective of the present invention to provide a methods and apparatus that utilize greatly simplified local, real-time meteorological data to make calculations used to adjust irrigation schedules.

It is another objective of the present invention to provide methods and apparatus that minimize the margins and sources of error within automatically and climatically adjusted irrigation schedules by limiting the number of variables and relationships necessary to calculate and adjust the schedules.

It is another objective of the present invention to provide methods and apparatus that may be embodied into any irrigation controller that are inexpensive to manufacture, install, operate and maintain.

It is another objective of the present invention to provide automated methods and apparatus for water conservation and management and implementation of governmental or other watering restrictions.

Additional objects of the present invention shall be apparent from the detailed description and claims herein.

BRIEF DESCRIPTION OF THE DRAWINGS

FIG. 2 shows the published extraterrestrial radiation factor chart for various latitudes. This chart is also shown as FIG. 6 in parent U.S. Pat. Nos. 7,058,478; 7,266,428; 7,844,368; and of published pending application Ser. No. 12/955,839 from which this application claims priority.

Figure 3:
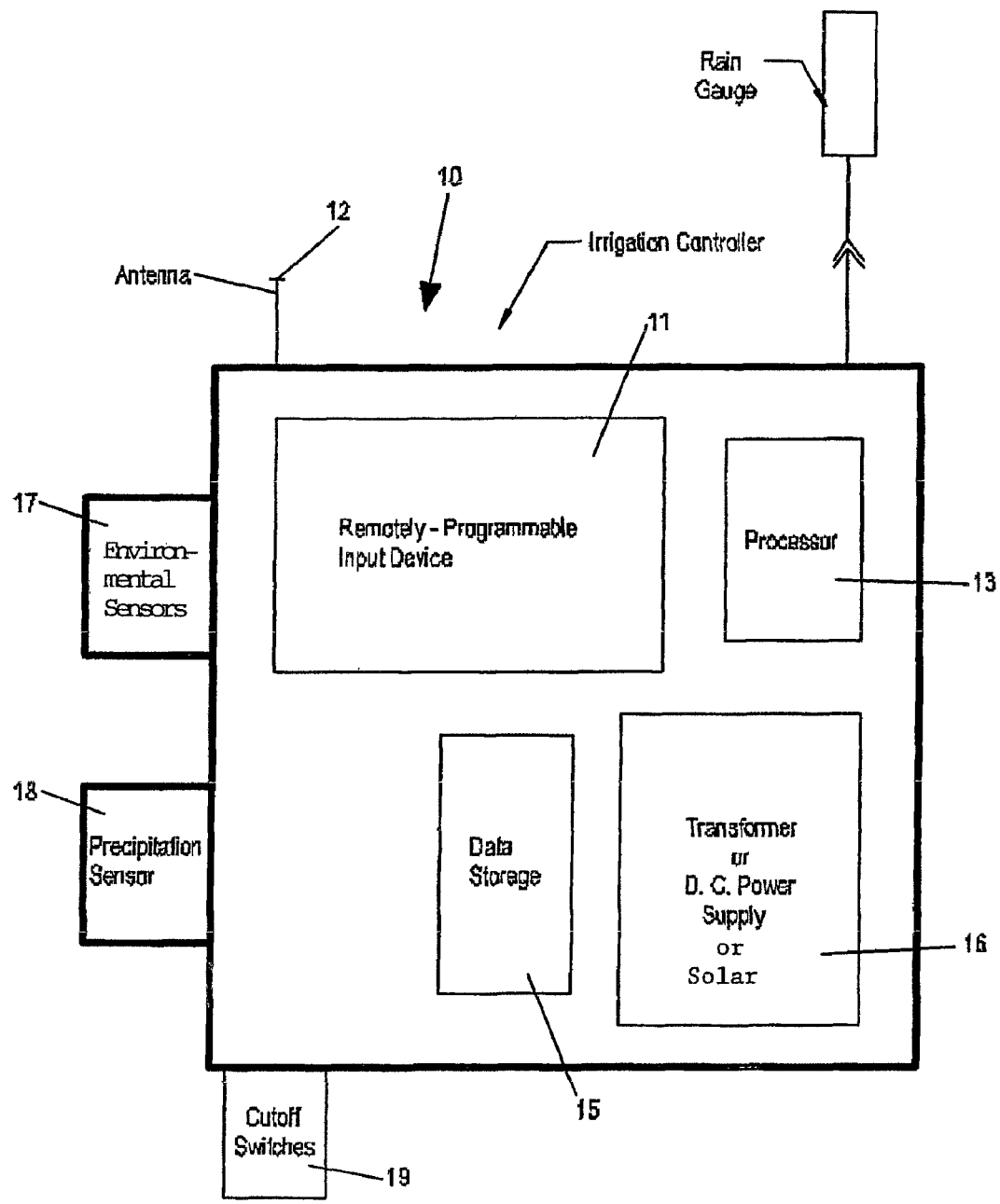

FIG. 3 illustrates a block diagram of an embodiment of a smart irrigation controller. This diagram is very similar to FIG. 2 in parent U.S. Pat. Nos. 7,058,478; 7,266,428; and 7,844,368 from which this application claims priority.

Figure 4:
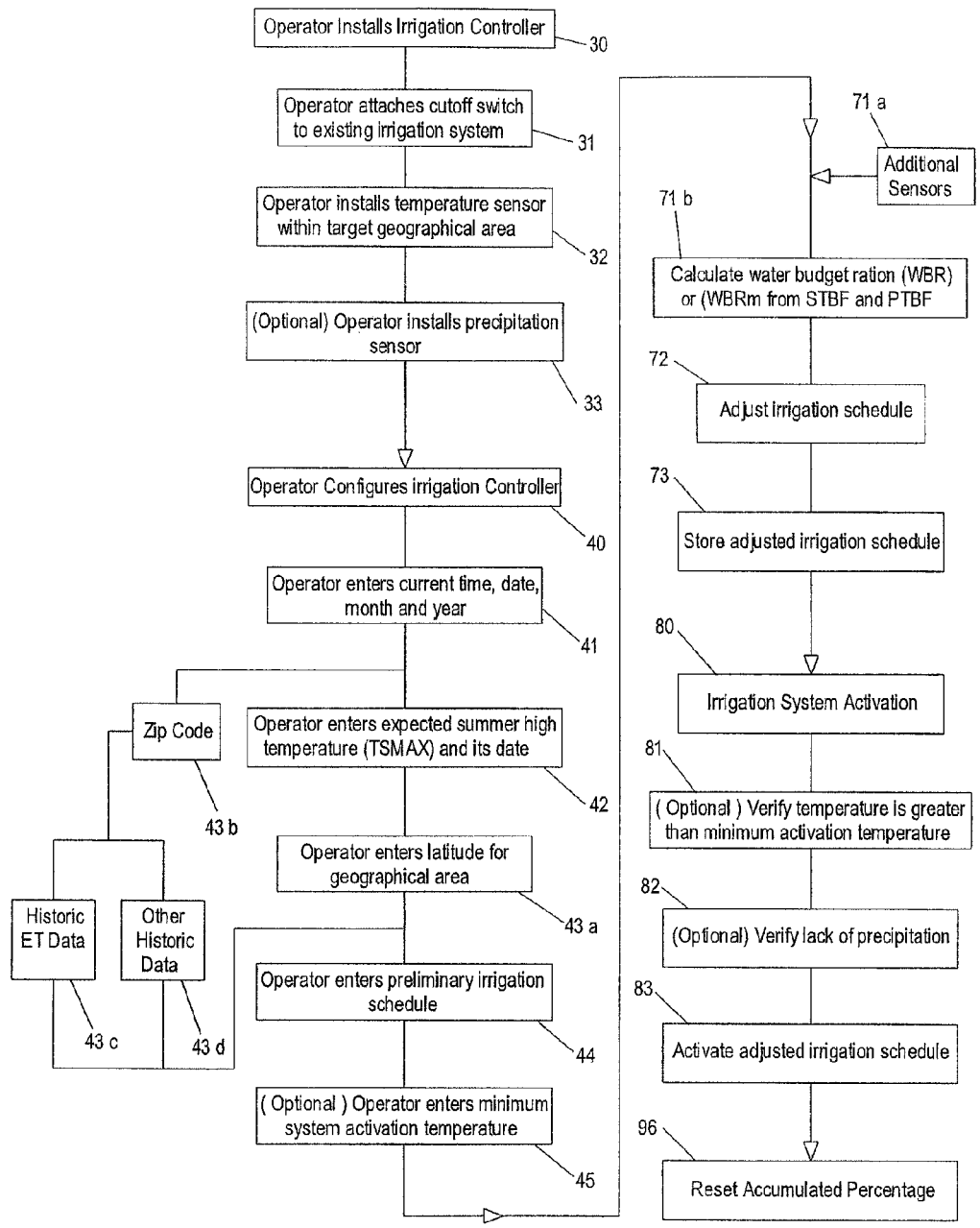

FIG. 4 is a flow chart of an embodiment of a preferred method of temperature budgeting within the controller of FIG. 3. A similar diagram is also shown as FIG. 4 in parent U.S. Pat. Nos. 7,266,428 and 7,844,368 from which this application claims priority.

FIGS. 5A, 5B, and 5C show the SWAT results of two controllers and one add-on device using temperature budgeting.

FIGS. 6A and 6B show an example of seasonally restricted watering schedule as specified by the SNWA.

Figure 7:
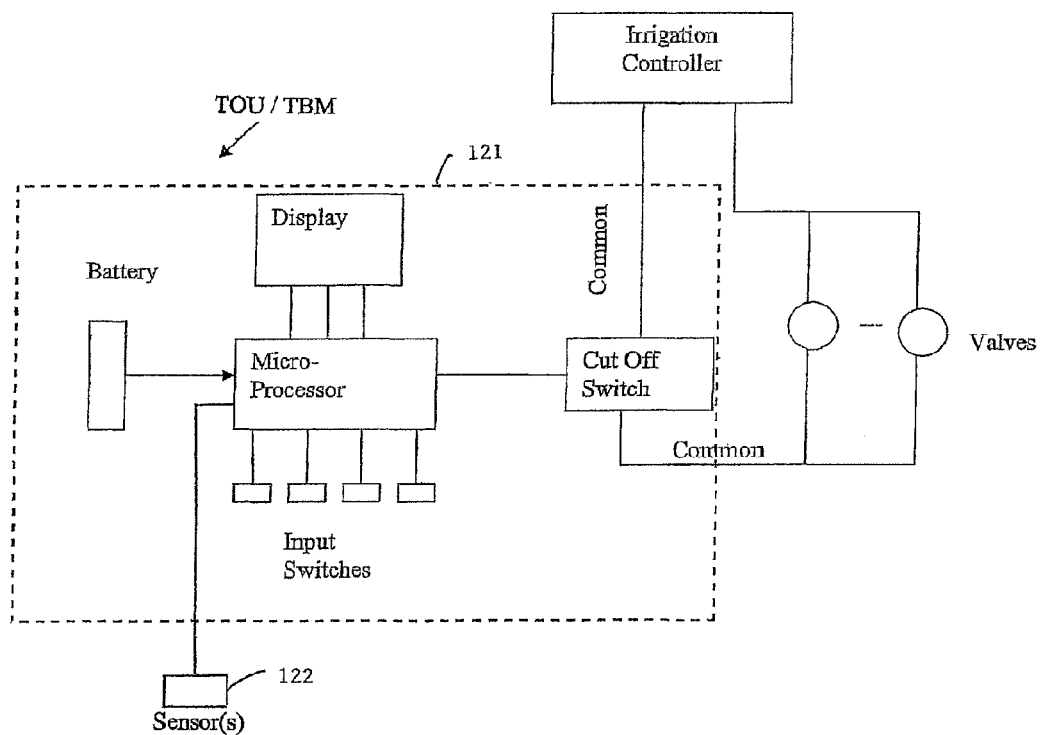

FIG. 7 shows the block diagram of an embodiment of an add-on to an existing controller to make it smart or to enforce compliance with restricted watering schedules. This embodiment is also shown in FIG. 19C of the U.S. Pat. No. 7,844,368.

Figure 8:
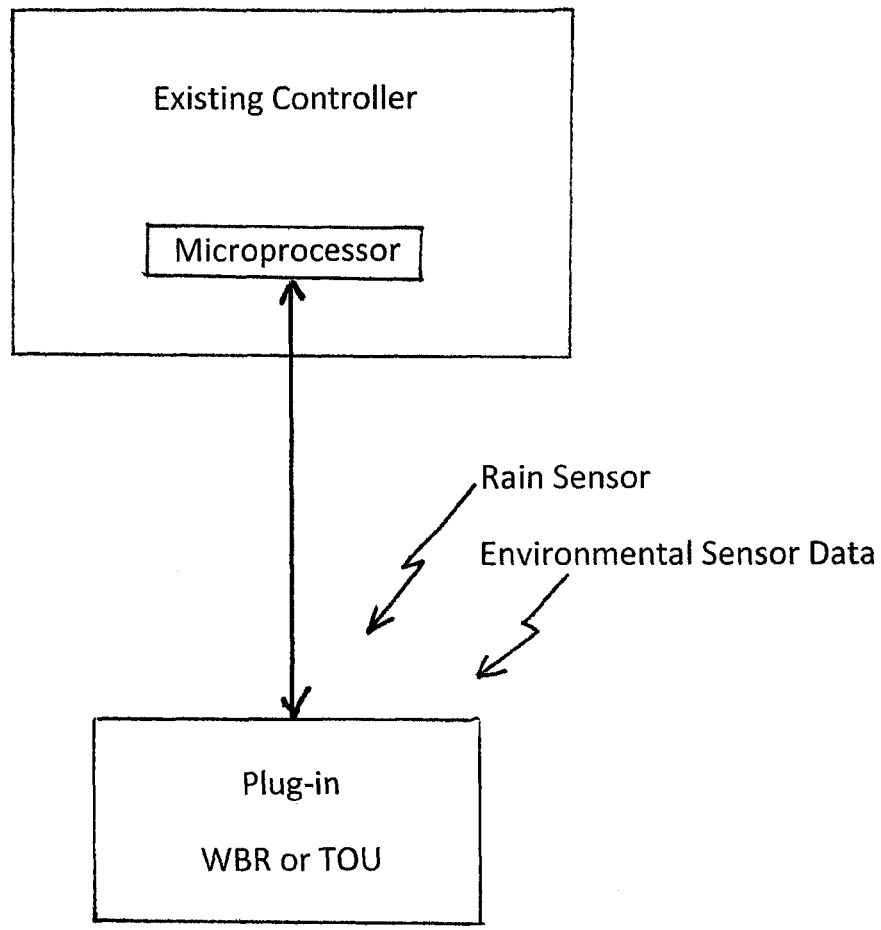

FIG. 8 is a block diagram of an embodiment of a plug-in to an existing controller to make it smart or enforce compliance with restricted watering schedules.

Figure 9A:
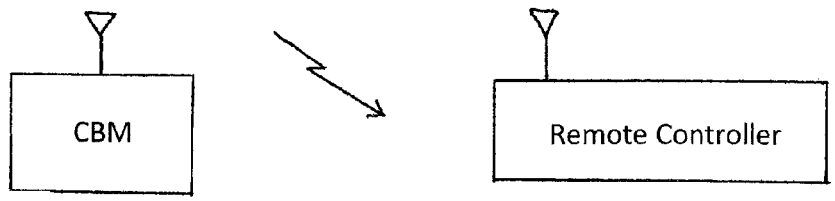
Figure 9B:
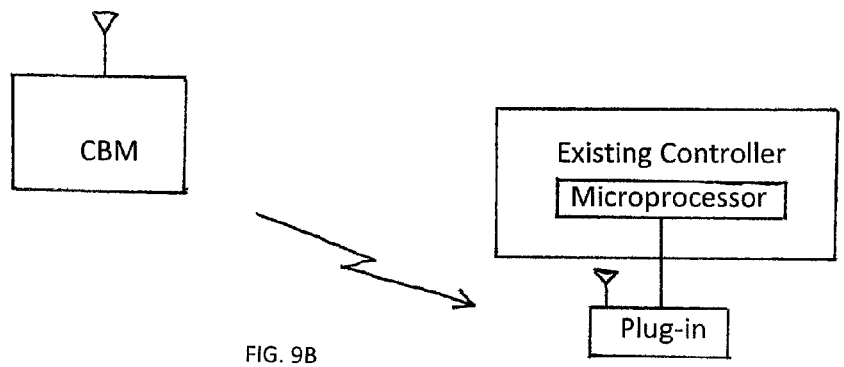
Figure 9C:
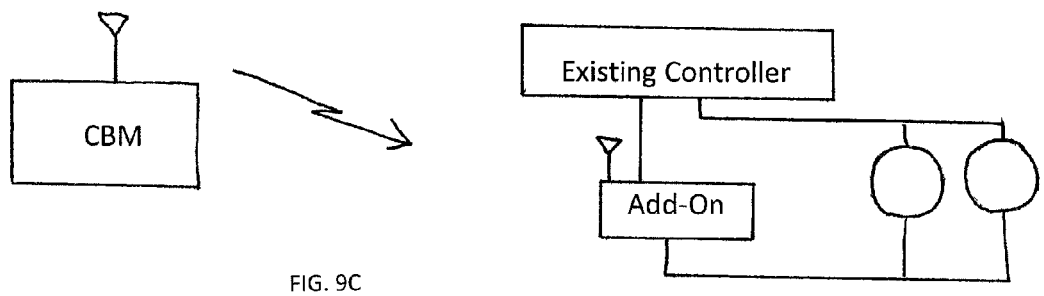

FIGS. 9A, 9B, and 9C are block diagrams of embodiments of a central broadcasting system that may provide a water budget percentage and/or restricted watering schedules to remote irrigation controllers, plug-ins or add-ons.

Figure 10:
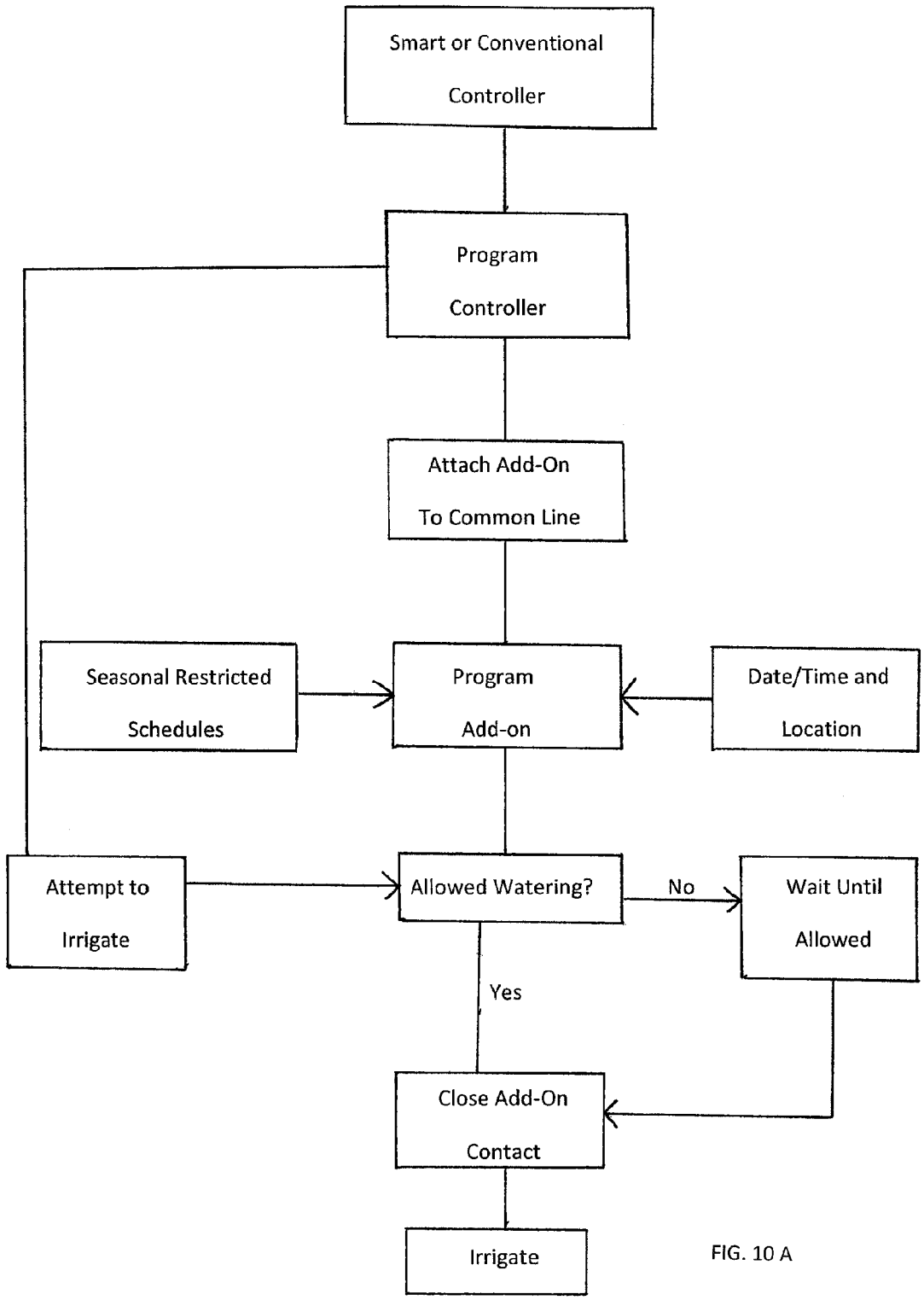

FIG. 10A is a flow chart of a smart or conventional controller used with an embodiment of an add-on with automated seasonal watering restrictions.

Figure 10B:
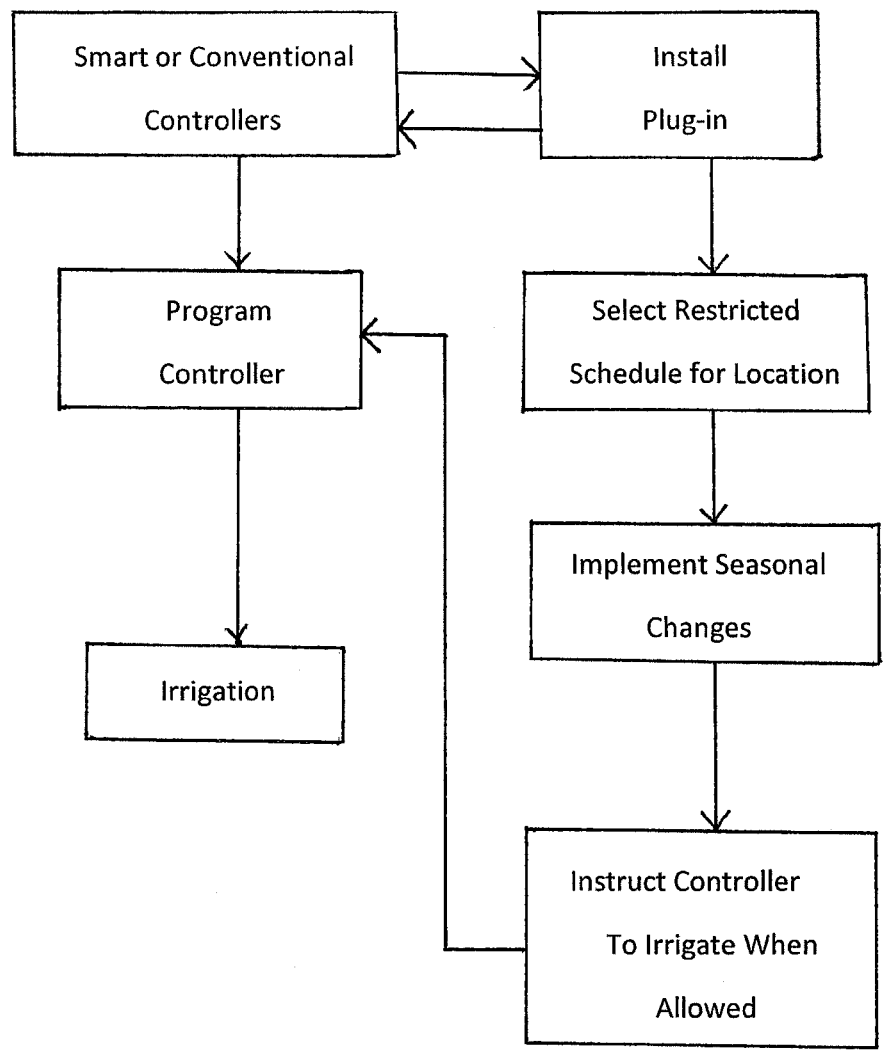

FIG. 10B is a flow chart of a smart or conventional controller used with an embodiment of a plug-in with automated seasonal watering restrictions.

Figure 11A:
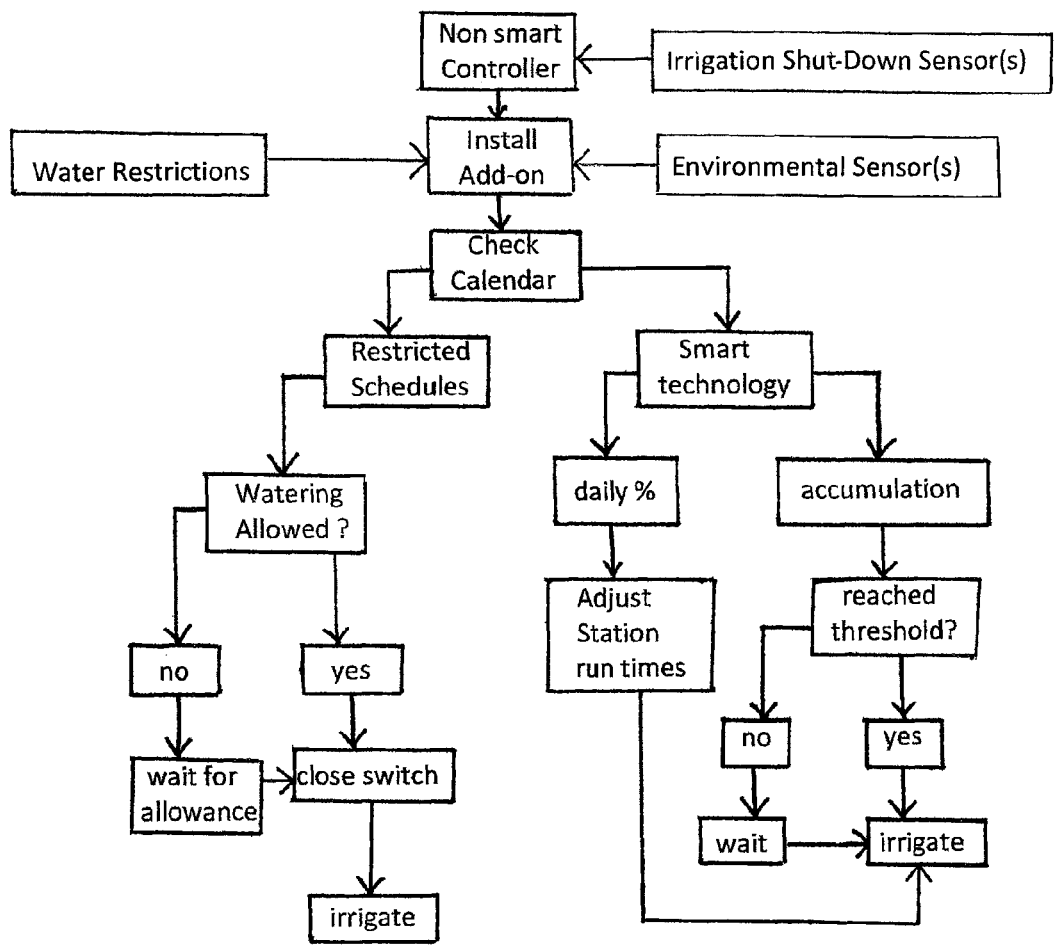

FIG. 11A is a flow chart of a conventional controller in communication with an add-on embodiment of the present invention that is capable of controlling dual use of watering restrictions and smart technology in the add-on.

Figure 11B:
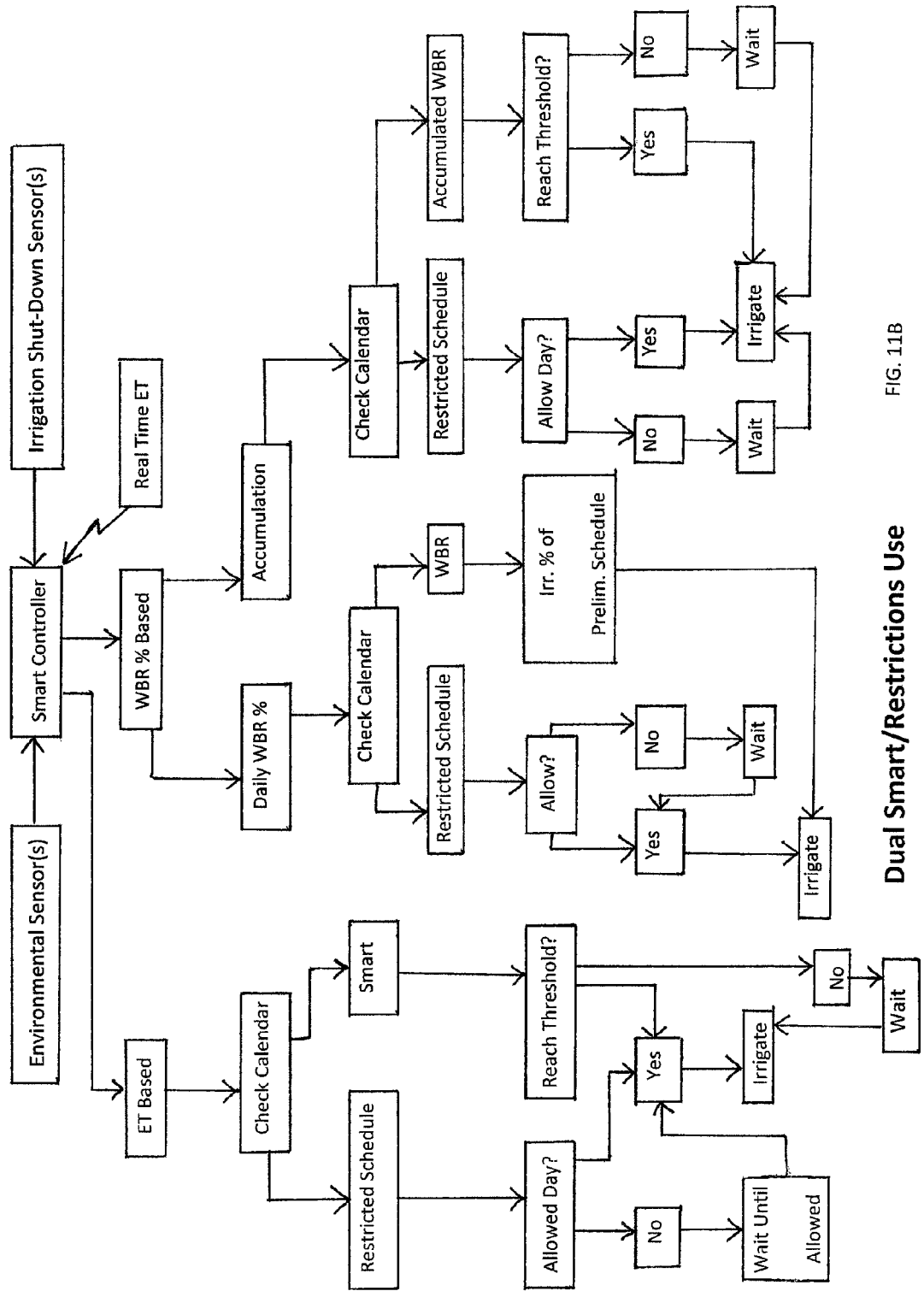

FIG. 11B is a flow chart of a smart controller embodiment of the present invention that is capable of controlling dual use of watering restrictions and smart technology that may be ET based or water budget percentage based.

Figure 12:
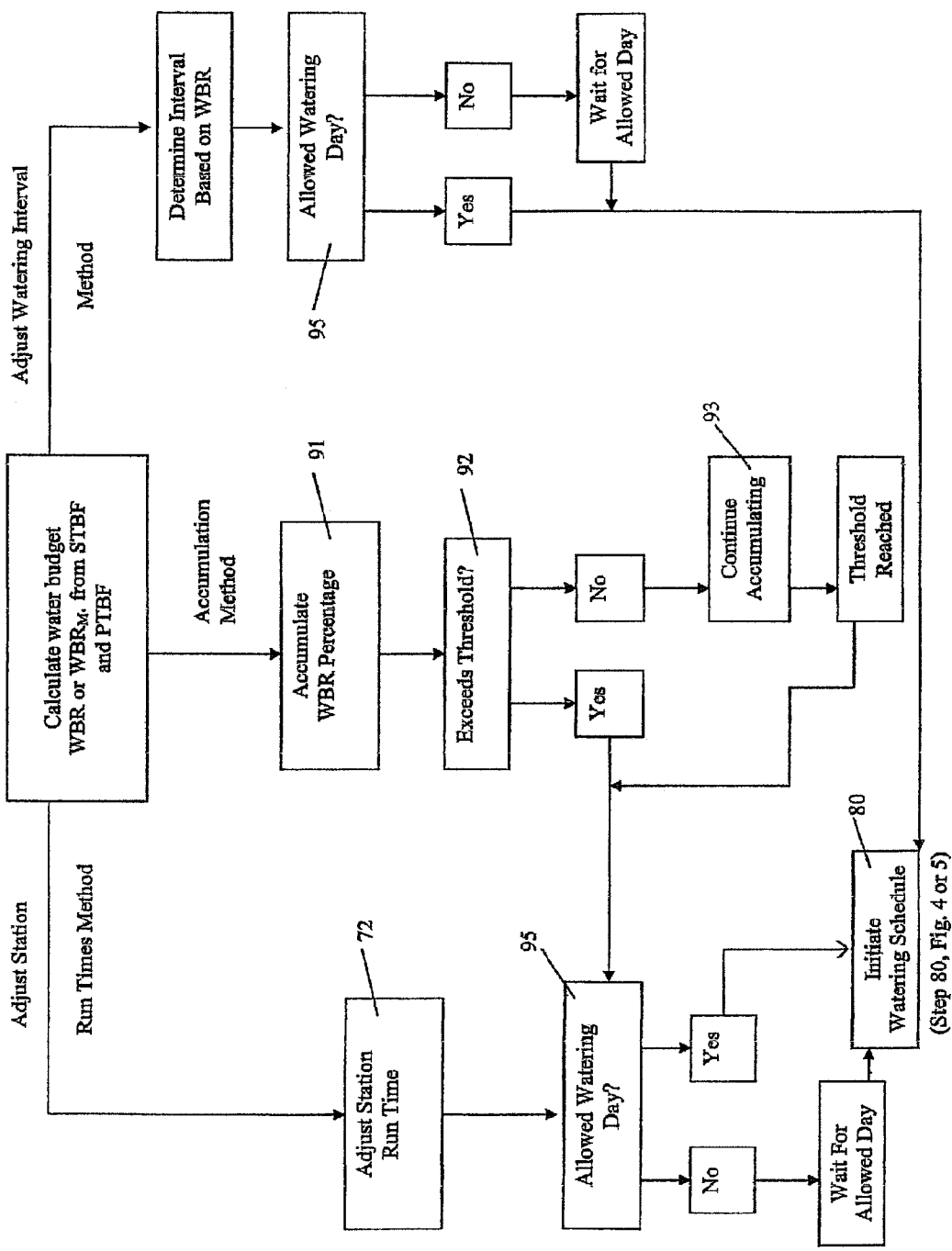

FIG. 12 is an exemplary flow chart depicting alternate implementations using water budgets including adjusting station run times daily, the accumulation method, and the adjustment of watering intervals, as previously depicted in FIG. 4A of U.S. Pat. No. 7,844,368.

Figure 13B:
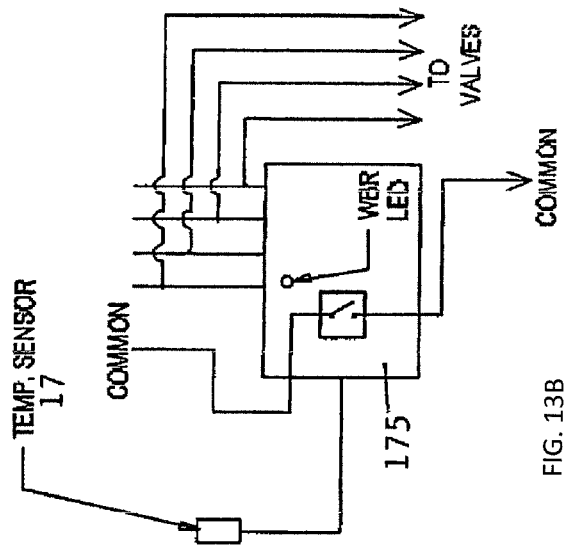
Figure 13A:
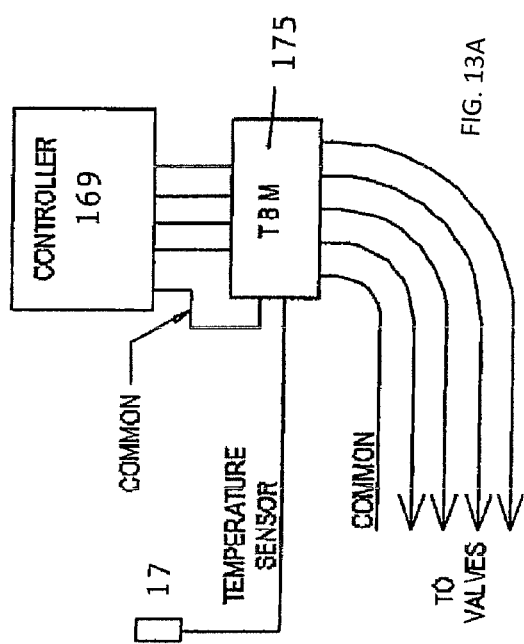

FIGS. 13A and 13B show two embodiments of an add-on that learns the controller station run times and modifies the outputs of the controller accordingly.

Figure 14:
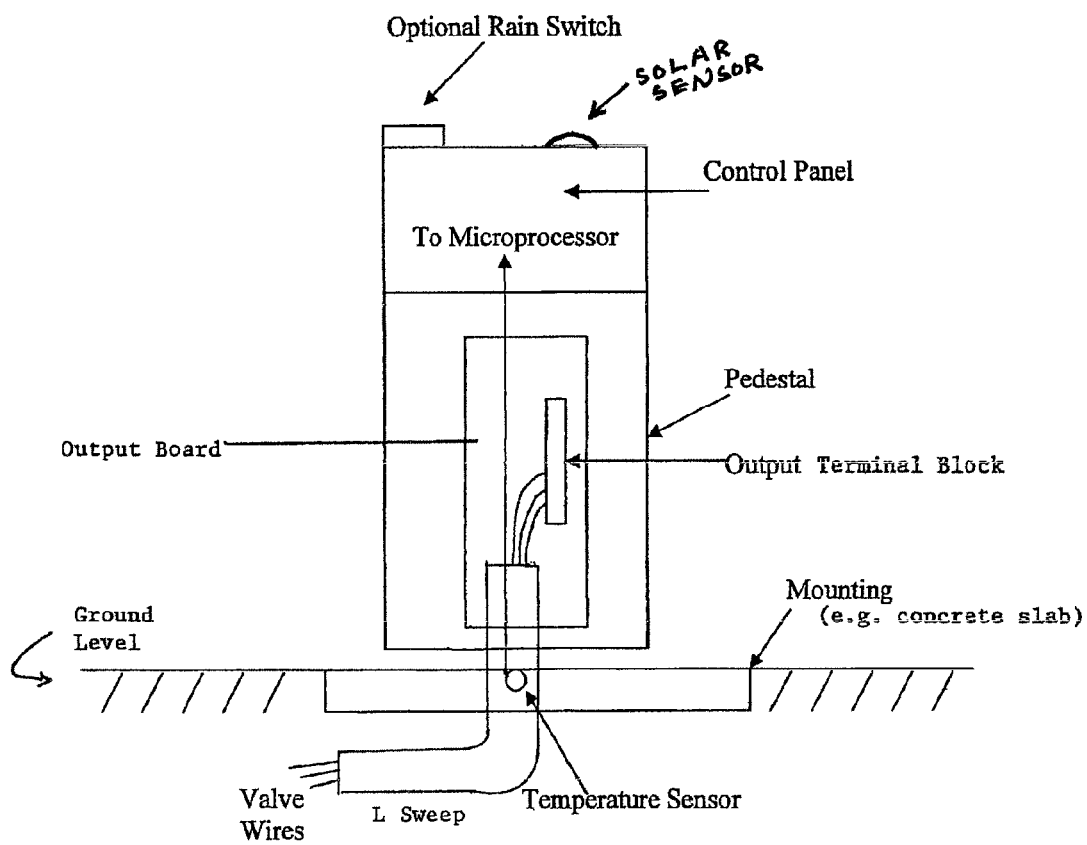

FIG. 14 illustrates an embodiment of a self-contained irrigation controller in an outdoor pedestal showing internal temperature and rain sensors.

FIG. 15 is an example of a computer screen that may be used to select, program, and implement automated watering restrictions, including alternating between smart use and restricted watering use.

DETAILED DESCRIPTION

Referring to the drawings wherein like reference characters designate like or corresponding parts throughout the several views, and referring particularly to the chart of FIG. 1, it is seen that this chart compares the monthly ET percentage values obtained using the Penman-Monteith formula (currently favored by the USFAO and CIMIS) with the ratios (percentages) obtained utilizing a temperature budgeting formula of a preferred embodiment described herein. Such comparison was made over a period of five years at twenty-five environmentally-diverse locations within the State of California. Both formulas used the same CIMIS data. For the Penman-Monteith formula, the published historical monthly ETo was divided by the historical summer ETo. The monthly temperature budget factors obtained by the present invention were similarly divided by the summer temperature factor. The ETo ratio is then compared to the WBR for relative accuracy. As indicated by FIG. 1, the values obtained using a formula of an embodiment of the present invention closely approximate the Penman-Monteith, generally more so than the other ET formulas such as those referenced in the Catteano and Upham study. This indicates that the temperature budgeting embodiments of the present invention are comparable to the other ET formulas, since a simple to understand method of the present invention is ninety-five percent as accurate or better than a more complicated ET calculation.

Figure 1A:
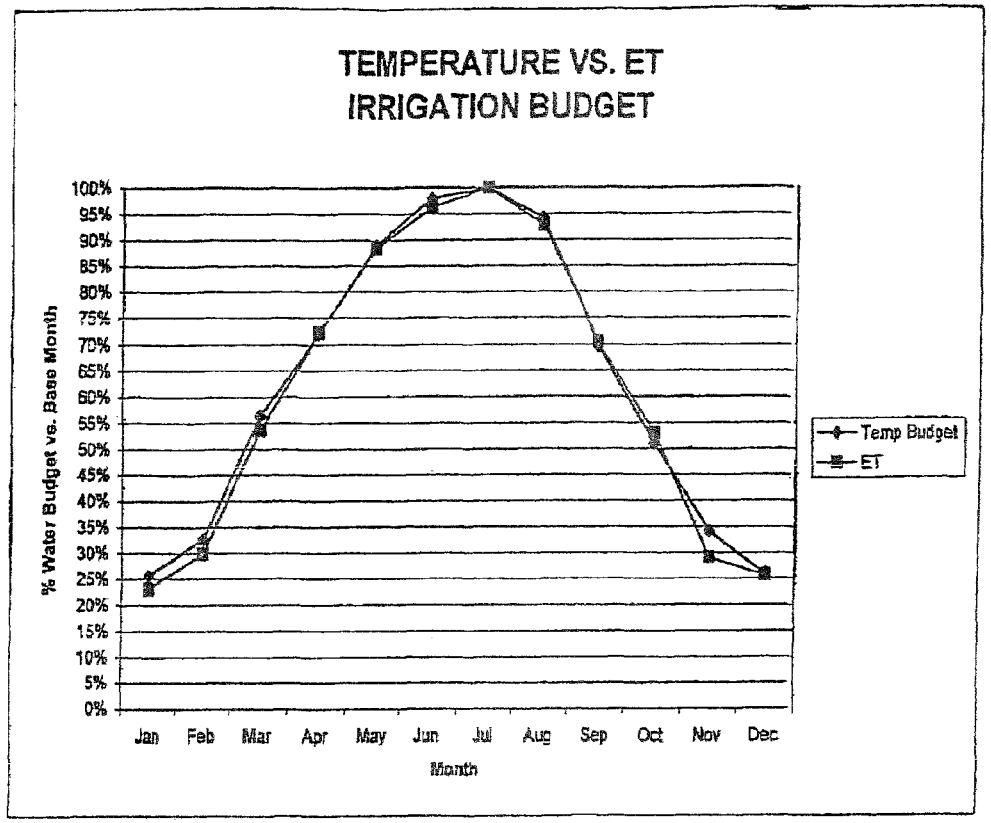
FIG. 1A is an analytical comparison of evapotranspiration (ET) and temperature budget percentage values for certain geographical areas of California over a five year period, beginning in 1997. This comparison is also shown as FIG. 1 in parent U.S. Pat. Nos. 7,058,478; 7,266,428; 7,844,368 and of published pending application Ser. No. 12/955,839 from which this application claims priority.

FIG. 1A also illustrates that historical ET percentage calculations closely approximate temperature budgeting percentage calculations of embodiments of the present invention, demonstrating that historical ET may be reliably used in determining water budget ratios in embodiments of the present invention. In particular, and without limitation, historical ET may be used in a manner similar to the STBF, and/or historical ET may be used in calculating the STBF, and/or historical ET may be used in calculating the WBR. It is not necessary, nor is it part of any embodiment of the present invention, to actually perform calculations resulting in ET values; instead, it is to be appreciated that previously-calculated historic ET values may be used in some embodiments of the present invention.

Furthermore, the present invention is advantageous over the Penman-Monteith, or any other ET, formula in that it reaches similar irrigation time values or irrigation schedules without relying upon the numerous variables and relationships of ET theory, or a subsequent calculation of irrigation time settings as described in the parent applications.

Another advantage of the present invention over the Penman-Monteith formula, or any other ET formula, is in terms of hardware costs. Specifically, in at least one alternative embodiment, the only new hardware required is a temperature sensor—an existing irrigation controller, assuming that it satisfies certain minimum system requirements (such as the availability of an input port for the temperature sensor, sufficient memory to store the RA lookup table, and the ability to receive the software instructions for the present invention), may otherwise be used. This controller may be AC, DC, solar, or battery-powered.

Figure 1B:
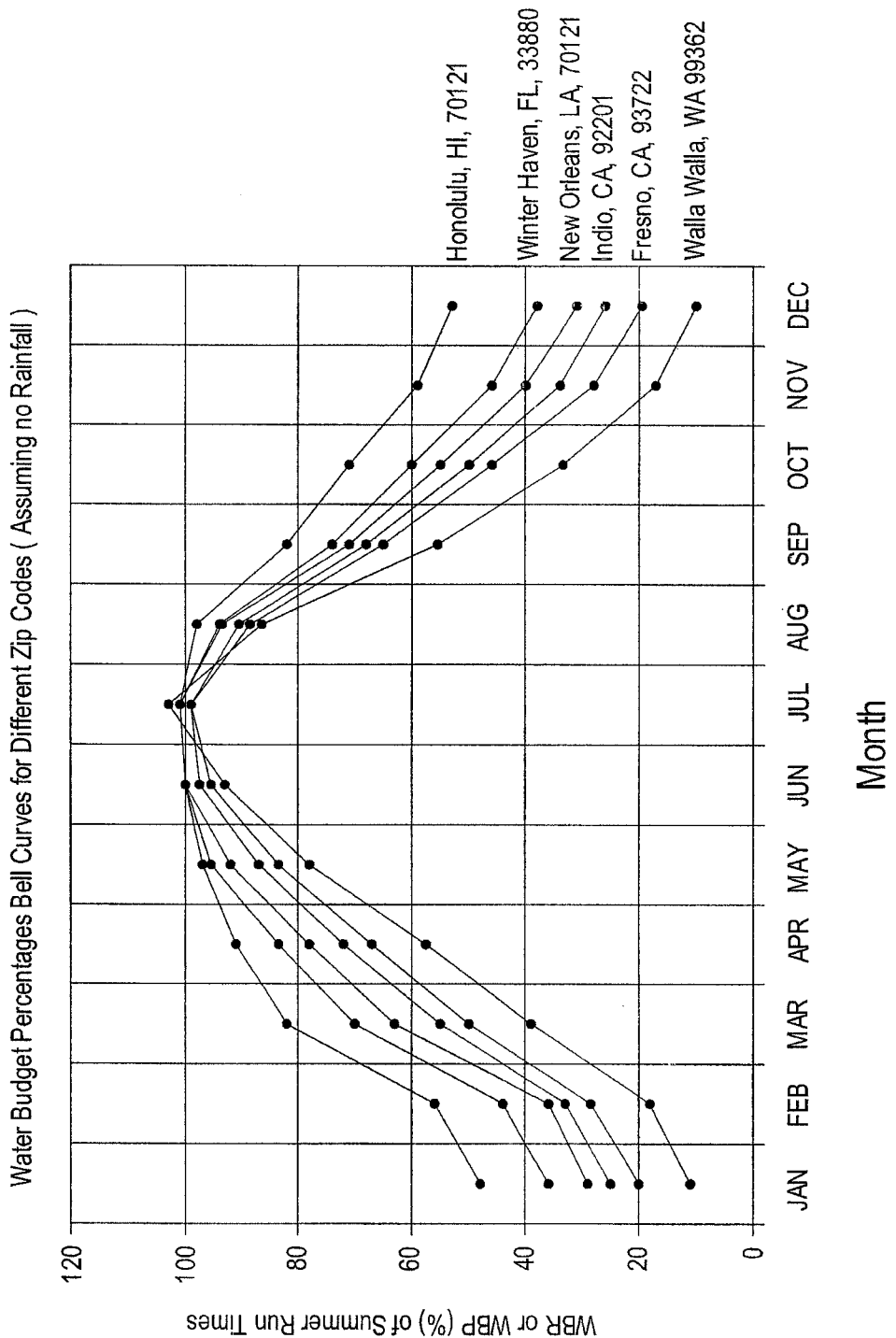
FIG. 1B shows a variety of ET-based historic bell curves for various locations identified by zip codes.

FIG. 1B shows historical percentage (WBR) curves for various zip code selected locations in the U.S. As expected, Hawaii has the flattest WBR bell curve because of its year round relatively low range of high temperatures.

FIG. 2 is a published (prior art) listing of extraterrestrial radiation expressed in equivalent evaporation. This Ra chart is used with one of the preferred embodiments that does not require the use of historical ET. Alternative embodiments may use historical ET instead of Ra because historical ET is as simple to implement in the determination of the water budget ratio. When historical ET is used, it can effectively be substituted for the Ra factor because both the Ra and ET use the same units of measurement, which are millimeters of water per day. In both cases, a percentage or ratio is determined by comparing stored to current geo-environmental data.

FIG. 3 is a block diagram of a typical irrigation controller with one or more external environmental sensors, an optional external precipitation sensor, a microprocessor with data storage, and a power supply. The external temperature, soil, solar radiation, wind, relative humidity or other sensors are provided by wired or wireless means as current or real time sensor data. These sensors are in communication with the controller FIG. 4 shows a flow diagram for the exemplary controller of FIG. 3 which is depicted as a smart controller using an embodiment of temperature budgeting. In this non-limiting example, the operator installs the irrigation controller and connects it to one or more irrigation valves (step 30). The temperature sensor or any other sensor (rain, wind, solar radiation, soil moisture, soil temperature, relative humidity or combinations thereof) are placed in communication with the controller microprocessor by wired or wireless means (32 and 33). The operator configures the irrigation controller (e.g., programs the summer or peak irrigation schedule) by first entering the date and time (41). In preferred embodiments, the operator then enters the local zip code (43b) which may automatically provide latitude, the Ra factors, and the historic temperature data, or alternately historic July or peak ET data as shown in item 43c, or monthly, weekly, or daily alternate historic and stored geo-environmental data (item 43d).

In step 44 of FIG. 4, the operator enters the preliminary (e.g., summer) irrigation schedule from personal experience, professional assistance, or with internet or other guidance. If a minimum irrigation temperature is desired, that is entered in step 45. The microprocessor then determines the water budget ratio or percentage (71b) and adjusts the preliminary irrigation schedule according to the determined water budget ratio. Additional sensors (71a) may be used to determine whether or not to stop irrigation (81, 82) based on recent precipitation, rain, etc. The controller then activates the valves with station run times modified or adjusted according to the water budget ratio if the minimum irrigation temperature is exceeded and there is no precipitation. A similar water budget determination may be made using historic average ET compared to historic monthly ET, and adjusted according to the current temperature compared to the expected historic temperature for that day.

As with the other embodiments, multiple watering restrictions could be programmed within the controller and selected by zip code, region, municipality, or water district designation. These restrictions may then be varied automatically by embodiments of the invention at various times of the year, but typically seasonally (but not necessarily based upon the calendar seasons) because of the wide diversity of the locations such as dry deserts, the humid South East, the coast, mountains, northern colder states, etc. In particular, automatic implementation of watering restrictions may be used in conjunction with automatic implementation water budgeting in numerous embodiments of the present invention. In some of those embodiments, watering is prevented according to an applicable restricted schedule and then, when allowed, watering is limited (the controller's watering schedule is modified) by a water budget ratio. In other embodiments, watering start times or watering days are moved to comply with the applicable watering restrictions, and watering is then limited by a water budget ratio. In other embodiments, during some times of the year, watering may be prevented or start times moved (as above) according to the applicable watering restrictions without any watering limitations when watering is allowed; but during other times of the year, the watering restrictions are not used, and watering is instead limited according to whatever "smart" irrigation technology is in place, which may or may not use water budget ratios.

FIGS. 5A, 5B, 5C show the results of three products that use preferred temperature budgeting tested under the SWAT protocol. FIG. 5a is for the Smart Clock and shows an average deviation of 0.2% from the Pennman-Monteith standard landscape evapotranspiration root zone water content. FIG. 5B is for a battery powered smart controller with a self contained temperature sensor which shows an average deviation of 1% from the standard root zone ET based watering needs. FIG. 5C is for the Universal Smart Module, an add-on device that determines water budgeting and modifies the output of any AC powered controller based on that water budget percentage. In all three products, virtually no irrigation deficit was noted. These results confirm the analytical study of FIG. 1A that the water budget determination method closely approximates ET without its complications.

FIGS. 6A and 6B are the "Drought Watering Restrictions" imposed by the Southern Nevada Water Authority (SNWA). The entire area of Southern Nevada is divided into six landscape water zones A-F. Each zone can water on different days, which vary depending upon the season. In addition, depending upon the season, only certain times of the day are allowed watering times. For example in FIG. 6A, watering group B can water Tuesdays, Thursdays and Saturdays during the spring or fall, but only on Tuesdays in the winter. During the summer, all groups may water every day, but irrigation is prohibited as noted in FIG. 6b during the summer between 11 am and 7 pm. The SNWA seasons are defined as March 1 to April 30 for spring, May 1 to August 31 for summer, September 1 to October 31 for fall, and November 1 to the end of February for winter. Note that these seasonal changes to not match calendar seasons.

As heretofore prescribed, the operator would need to manually modify the controller watering days or times of the day to comply with these seasonal requirements. This fact is the main reason why total compliance in the SNWA region was only 8% historically and resulted in many fines for those who did not change their schedules manually by seasons.

FIG. 7 shows an embodiment of an add-on device or module attached to the common electrical line from the controller to one or more valves. The controller which may be smart or conventional is programmed with its summer or peak irrigation schedule, including its station run times. The preliminary schedule can be determined by any means available such as from personal experience, web site assistance, with or without the use of historical data which may include stored ET data, or by professional assistance.

The cutoff switch is internal to this embodiment of an add-on and breaks the common line to inhibit irrigation when watering is not allowed. In addition, or alternatively, this or other add-on devices can also be programmed to make the existing irrigation controller smart either by learning the summer or peak watering run times and modifying them during other times of the year, or accumulating the daily water budgets until a threshold is reached and then allow the existing controller to irrigate its summer schedule. The result of accumulation would be to increase the watering interval of days during the cooler times of the year. Thus, this exemplary add-on can be a time of use restricted watering scheduler, a water budget determinator for daily station run time adjustments, or a watering schedule changer if used in the accumulation mode, or any combination thereof. In many of these applications, the wiring is identical as shown in FIG. 7.

For example, if the controller is located in the SNWA area, the location may be designated as watering group "B" as shown in FIG. 6A. Without regard to the watering restrictions, the controller is programmed to start an irrigation cycle every day. The start time is set for 7:00 am, and the station run times are set for a summer schedule having a duration of 8 minutes for a particular station. If the current date is Sep. 16, 2011, the programming of this exemplary module as a TOU unit could be:

Entering the date and time as Sep. 16, 2011 and 4:00 pm.

The watering group is entered as "B" during the course of programming the module. According to the 2011 calendar, September 16 is a Friday. According to the SNWA (FIG. 6A), Group B can only water on Tuesdays, Thursdays, and Saturdays. Therefore, group B is not allowed to water on Friday September 16. In this case, a cutoff switch in the module, such as that shown in FIG. 7 is open all day starting at midnight, and does not allow irrigation to occur at 7 am or at any other time during that day when the controller attempts to irrigate.

Now let us assume that the exemplary add-on is an embodiment that works as an accumulation smart add-on. In this case, the controller is still programmed with its summer irrigation schedule with start times, watering days, and station durations (run times). The module is connected to the output in the same way as the TOU device. In this case, however, one or more sensors (122) are provided to the module which communicates environmental data to the module microprocessor. These sensors could be temperature, rain, solar radiation, wind, relative humidity or any combination thereof. Location information (such as the zip code) is entered and the microprocessor selects from its internal data storage of historical environmental data for that location. Such data may once again be temperature, solar radiation, wind relative humidity, soil moisture, soil temperature, historic ET data, etc. Periodically, (preferably once a day at midnight), the microprocessor determines the water budget ratio (percentage) by comparing stored geo-environmental data to current geo-environmental data from the sensor (such as today's high temperature). For this exemplary accumulation embodiment, a minimum threshold level is entered or established. The module will not allow irrigation until that threshold is met or exceeded. This threshold may be defined by the user, and could be anywhere up to 100% (depending on such things as soil and landscape vegetation type, to insure that an adequate amount irrigation run time is provided to allow for deep root penetration. Water budget percentages are calculated each day, and accumulated day after day until the threshold is reached. On the day (or day after) the threshold is reached, watering is then allowed to occur. For example, if it is during the cooler time of the year, such as December in the Northern Hemisphere, the daily accumulation may only be 14% for the first day, and perhaps 16% the next day, and so on. If the threshold is set for 100%, at this rate it may take six days before irrigation is allowed.

In related embodiments, if automatic time of use restrictions are also incorporated into the module, and the threshold is reached on a non-watering day, irrigation is prevented until an allowed day is reached. This procedure is very similar to the accumulation method of FIG. 12, except that this is done in an add-on instead of within a controller.

Some advantages of this type of add-on are:
1. The module is compatible with any module or size of AC powered irrigation controllers. It is even compatible with a DC powered controller with a minor change to the hardware (such as that shown in FIG. 19B of the '368 patent).
2. Since the module will work with any controller, the operator (homeowner, landscape maintenance contractor, apartment manager, etc.) keeps his existing controller that he is familiar with.
3. The cost of the add-on is less than a new smart controller.
4. Only one model of module needs to be inventoried or learned for universal use.
5. The module can make any existing controller smart or make any existing controller, smart or conventional, comply with watering restrictions.
6. The module will save more water because of its simplicity and increased use and compliance.

FIG. 8 shows an embodiment of a smart plug-in of a time of use watering restriction device in direct communication with an existing controller microprocessor. In this case, the plug-in is still an add-on in that it is added to an existing controller to make it smart, but this type of module can communicate with the controller's microprocessor. This exemplary plug-in module may be provided with one or more environmental sensors, and possibly a rain sensor. The plug-in has internal historic geo-environmental data which may consist of ambient or soil temperature, solar radiation, wind, relative humidity, or historical ET for that location. In addition, it may perform a daily water budget or seasonal adjust determination which is then communicated to the controller directly. The existing controller then adjusts its station run times accordingly if the daily water budget method is used. If accumulation is used, the plug-in or controller is programmed with the desired threshold and the controller initiates irrigation when the threshold is reached or exceeded.

In addition to smart technology, watering restrictions could be entered into the plug-in or downloaded into it through the internet, by wireless means, by means of a small data storage device loaded with one or more watering restriction schedules, or by other means. Entering the zip code or a numbered location may allow the module to select the specific municipal watering restrictions appropriate to that location. A WI-FI communication link could also provide this allowed/not allowed watering data. Power for the plug-in could be provided from the controller, or the plug-in could be battery powered. Once again, the environmental sensor data could be provided by wired or wireless means.

Again, the specific equation or parameters or types and combinations of sensors, or whether they are wired or wireless does not alter the smart invention, which is to alter the watering schedule of a controller by determining a water budget percentage by comparing current to historical geo-environmental data, and use that water budget to vary the station run times or adjust the irrigation schedule.

In terms of restricted watering schedules, the preferred method of this invention is to provide one or more restricted watering schedules, select the appropriate one if more than one is provided, and modify the controller irrigation to match the allowed watering days of the week, days of the month, or the times of the day, to include the seasonal automation of those schedules. This may be done by simply preventing irrigation on days/times when not allowed according to the applicable restricted schedule, or by modifying station start times so that irrigation occurs on dates or times when allowed according to the schedule. In related embodiments that also include water budgeting, once an allowed watering time (or start time) is reached, the watering may be limited (e.g., shorten station run times) according to the water budget percentage.

FIG. 9A shows a block diagram of an embodiment of a centralized system. Such a central unit may be designed to cover a park, school, apartment complex, or the like, sending the water budget or watering restrictions, or both, to remotely located controllers such as in FIG. 9A, or to a plug-in of FIG. 9B, or to an add-on of FIG. 9C. Such remotely located units may be addressed as a single group, multiple groups, or individually by the central unit. Normally, the communication is by wireless means (broadcast), although the central unit may communicate to the controllers, add-ons or plug-ins over the internet, or by other suitable means. Alternately, the central system may consist of a city wide central irrigation system sending to all three embodiments. As in the other embodiments, the water budget percentage and/or automated watering restrictions can be sent.

It is to be appreciated that the various steps and parts of the methods and apparatus of the present invention may be distributed in different permutations and combinations between the central unit and the receiving units (controllers, add-ons or plug-ins). For example, and without limitation, in some embodiments, the central unit may generate the water budget percentages and send them to the receiving units for implementation. In other embodiments, the central unit may simply provide current environmental data to the receiving units which themselves generate and then implement the water budget percentages. In other embodiments, the central unit may receive several sets of watering restrictions (e.g., different restrictions being applicable at different seasons of the year), and the central unit decides which restrictions are currently in effect and sends those to the receiving units; in other embodiments the central unit sends all of the restriction sets to the receiving units which themselves determine which one is currently applicable. In some embodiments, water budget percentages may be accumulated in the central unit; in other embodiments, those percentages may be accumulated in the receiving units. In very simple embodiments, the central unit may perform numerous functions and simply send a "ok to water" or "not ok to water" signal (or a "start watering"/"stop watering" signal) to the receiving units. The central unit may also separately address individual receiving units. It is to be appreciated that these are only examples of how the steps and apparatus of embodiments of the present invention may be divided up between the central unit and the receiving units.

FIG. 10A is a flow chart of an embodiment of an add-on used with a smart or conventional controller, with TOU restrictions in the add-on. The controller may be programmed either conventionally or with the smart technology of choice, which may be with a temperature budgeting method of the present invention, or some other smart technology such as internal ET calculations or provided with ET data. The add-on embodiment is attached to an output of the controller to allow it to break the common line with its cut off switch such as that shown in FIG. 7. The add-on is programmed with historical geo-environmental data from location information (such as a zip code or latitude and longitude, or by environmental region). The programming of the add-on can be done manually, over the internet, or from a computer from which a memory device can transfer such historic data.

In addition, multiple restricted watering schedules may be pre-programmed into the exemplary add-on from which the restricted (TOU) schedule may be selected based on entering a zip code or other location data. The selected restricted schedule also provides the seasonal changes mandated by that municipality or water district. The add-on will then automate the changes to the allowed watering times of day, days of the week, or days of the month.

In some embodiments, once the smart or conventional controller determines it is time to irrigate, 24 VAC (or pulsed 12 VDC) is applied to the valves to energize in an attempt to irrigate. If it is not an allowed watering day or time of day, the cutoff switch is open. On an allowed watering day, the cutoff switch is closed, allowing irrigation to occur.

For DC applications, a diode may be placed in the circuit as shown in FIG. 19B of the '368 patent which is biased to only allow the closing of a valve and does not allow opening when the cutoff switch contact is open.

Referring to FIG. 10B, the controller may again be smart or conventional. In this exemplary embodiment, a plug-in is literally plugged into the controller to communicate with its microprocessor. Plug-ins can only communicate with compatible models of controllers and are therefore not universal, whereas an add-on that breaks the common line is compatible with virtually any controller. The plug-in is provided with or pre-programmed with one or more restricted watering schedules. Entering a location identifier (such as a zip code) selects the restricted schedule appropriate for that location. Entering date and time allows an applicable one of several schedules to be selected. The restricted schedule will often contain seasonal variations to its restricted watering schedule as noted in the SNWA FIGS. 6A and 6B.

Once the plug-in is programmed, it communicates the selected restricted watering schedule to the controller. The plug-in in effect becomes a governor of the irrigation controller. If the controller is smart, it may withhold activating the valves until an allowed watering day or time of day arrives; if not, the plug-in itself may prevent irrigation until such time.

FIG. 11A demonstrates the dual use of smart technology and watering restriction schedules, not at the same time, but during certain periods of the year. A conventional (e.g. not "smart") controller is programmed with an irrigation schedule appropriate to the landscape, and is provided with one or more irrigation shut down sensors. An add-on is attached to its output(s) which has a microprocessor that communicates with one or more environmental sensors, and has been provided with water restrictions programming. An output cutoff switch is provided within the module to allow irrigation when the switch is closed. The microprocessor in the add-on also has a calendar which can be programmed with dates during which smart technology is to be implemented, and other dates when restricted schedules are to be implemented.

In the exemplary dual use embodiment of FIG. 11A, if the calendar indicates that restricted watering schedules are appropriate for that day or period during the year, the add-on microprocessor uses the applicable restricted watering schedule to determine if it is an allowed watering day. If not, the switch contact within the add-on stays open (preventing irrigation) and the microprocessor waits until an allowed watering time of day, day of the week, or day of the month arrives before closing the contact. During the allowed watering time, the switch contact closes, allowing the controller to irrigate according to its irrigation schedule.

However, in this exemplary embodiment, the calendar may indicate that instead of restricted watering schedules, smart technology is to be implemented, which can be real-time ET-based, historical ET-based, water budget based, ground moisture sensor based, etc. The flow chart of FIG. 11A illustrates the use of smart technology that is water budget based. The two methods of water budgeting are daily water budgeting, which allows a percentage of the summer station run times typically on a daily basis, or the accumulation method. If the daily water budget is used, the add-on may have learned the summer run times of the controller by monitoring the outputs. At the appropriate percentage of irrigating a station matching the daily water budget percentage, the contact opens thereby shortening each station run time. If the accumulation method is used, the module microprocessor determines if the accumulated daily water budget percentages have reached the threshold level. If they have not, the percentages continue to accumulate until the threshold level is reached, then irrigation is allowed. If the threshold has been reached, irrigation is allowed. Of course, as in other embodiments, irrigation may be suspended from input from any of the irrigation shut down sensors such as a rain sensor, freeze sensor, or wind sensor.

FIG. 11B is a flow chart of an exemplary embodiment illustrating the dual use of smart irrigation or restricted watering schedules depending upon the time of the year or calendar dates. A smart controller is provided which may be ET based, historical ET based, water budget percentage based, soil moisture based, etc. The smart technology of the controller is not limited to the water budget methods of the present invention, but may receive, for example and without limitation, wireless real time ET data (current ET data is not used by any embodiment of the present invention), environmental sensor data from which $ET_0$ may be determined or calculated (ET is not calculated by any embodiment of the present invention), or soil moisture sensor data. The flow chart specifically shows ET-based and water budget percentage flow charts.

Regardless of the smart technology present, in this exemplary embodiment if the calendar shows that watering restrictions are appropriate for that day or time period of the year instead of the available smart technology, the controller microprocessor determines if it is an allowed day of the week, time or day, or day of the month. If it is, then the controller irrigates on that day. If not, it waits until an allowed time, then allows irrigation.

However, in this exemplary embodiment, if the smart technology within the smart controller is ET-based (which smart technology itself is not within the scope of this invention), illustrated on the left path of FIG. 11B, the calendar is checked to see whether the current date is appropriated for ET-based smart irrigation, or subject to restricted watering schedules. If ET-based smart technology is appropriate for that day, the controller determines if the ET has accumulated to a set threshold. If it has reached that threshold, irrigation occurs according to the prescribed smart ET calculations. If the threshold has not been reached, the controller waits until it is reached, then irrigates.

Alternatively, in this exemplary embodiment, if the smart technology in the controller is water budget percentage based (which smart technology is within the scope of this invention), two paths are available, illustrated on the center and right paths of FIG. 11B. Using the center path of daily water budgeting percentages, the calendar is first checked to see whether the current date is appropriated for water budgeting smart irrigation, or subject to restricted watering schedules. If water budgeting smart technology is appropriate for that day, irrigation is allowed according to the water budget percentage for that day.

In a variation of the water budgeting embodiment, if the smart technology is water budgeting with accumulation (right path of FIG. 11B), once again the calendar is checked to determine if it is appropriate for smart technology or restricted schedules. If water budgeting smart technology is appropriated for that day, and accumulation water budgeting smart technology is used, the water budget accumulation is checked to see if it has reached the threshold. If it has, irrigation is permitted. If it has not, the controller waits until the accumulation reaches the threshold, then irrigation takes place.

It is to be appreciated that in alternative embodiments not illustrated in FIGS. 11A-B, the use of automatic watering restrictions and automatic smart technology may be combined. For example, and without limitation, if a daily water budget percentage is determined for a particular day, but watering is restricted (not allowed) on that day during the hours of 7:00 a.m.-6:00 p.m., embodiments of the present invention may automatically change the watering start time to an allowed time (e.g. after 6:00 p.m.), and at that time also cause the watering run time(s) to be adjusted according to the daily percentage.

In alternative embodiments of FIG. 11B, a plug-in with the restricted watering schedule and calendar could be used to communicate with the smart controller.

In the flow chart of FIG. 11B, a third branch could be provided if the smart technology is soil moisture sensor based. In that case, the smart technology (default program) would be based on a soil moisture indication which would be used at certain times of the year, while at other times of the year, watering restrictions may be imposed.

FIG. 12 is an exemplary flow chart from FIG. 4A of the '368 patent depicting alternative implementations of a water budget (station run times, accumulation, and watering intervals). If these implementations are used in an irrigation controller, it is first programmed with its preliminary irrigation schedule and the schedule of allowed watering times (e.g., municipal watering restrictions). If the method of daily water budget calculations is selected, the water budget calculation is determined in the controller and adjusts the preliminary station run times, and checks to see if it is an allowed watering day. If not, it waits until an allowed watering day is reached. Alternatively, if watering is set to begin at a time that is not allowed on a watering day, the controller may automatically change the station start times until a time when watering is allowed on that day.

In the accumulation mode, the controller is again programmed with its preliminary irrigation schedule and the schedule of allowed watering times restrictions. A water budget is determined periodically with or without using historical ET. If the water budget does not exceed the set threshold, it continues to accumulate until the threshold is reached or exceeded. When the threshold is reached, the schedule of allowed watering times is consulted and if watering is allowed, the controller initiates watering. If not, it waits until allowed, or changes the start time(s) until an allowed time.

In another mode, the determined water budget projects the watering interval and initiates irrigation based on this projected interval and the allowed watering times.

FIGS. 13A and 13B represent exemplary embodiments of add-on modules (the letters "TBM" in the figures refer to "temperature budgeting module") that monitor the outputs of an existing controller in two ways. In FIG. 13A, each 24 VAC station output from the controller is monitored and the summer or preliminary station run times are learned by the module. Upon subsequent operation of the learned station, the valve operation is limited by the water budget determined for that day by the module. For example if the preliminary station run time for station 2 was twelve minutes, and the water budget for that day is 20%, the module would allow this station to run for 2.4 minutes before it is cut off.

In the version of FIG. 13B, each station is still monitored by the add-on, but instead of each station being individually controlled, control is affected by breaking the common line to all stations. This may result in certain stations coming on or off if two or more stations are being operated simultaneously. The advantage of the first version is independent station control, while the advantage of the second is simpler module circuitry and cost.

FIG. 14 illustrates an embodiment of a self-contained irrigation controller mounted in a pedestal. This can be a stand-alone AC powered controller, a DC or solar or ambient light powered controller, or part of a remotely located controller as part of a central system. The innovative matter is that the smart controller is self-contained. The sensor required in some water budgeting embodiments is provided nearby and communicates with the controller microprocessor and associated data storage device, if needed. Placing the temperature sensor near ground level provides a close approximation of ambient temperature reading. An optional internal rain sensor may provide shut down in case of precipitation, and the temperature sensor can also provide shutdown in case of near freezing temperature. In use, the operator programs the controller as any other conventional system. The water budgeting technology is either incorporated into the controller microprocessor, or communicated to the controller from a plug-in, or broadcast to it from a central location. Depending upon the method used (e.g. daily or accumulated water budgets), the controller irrigates accordingly. If restricted water schedules are also incorporated, this self-contained controller responds in the same manner as other embodiments where such restrictions are automatically implemented. As an option, this self-contained controller may not even require external AC power. It can be battery powered, solar powered, or ambient light powered to make it totally self-contained. If desired, additional sensor data can be provide to further modify the water budget, through additional sensors associated with the controller, or broadcast to it by wireless means.

FIG. 15 illustrates an exemplary computer screen from which a custom restricted watering schedule can be developed and provided to a controller, add-on plug-in, or other device to allow for automated seasonal watering restriction changes. This screen can also be programmed to provide for alternating between smart watering or restricted watering. This type of programming could be done on the computer, or directly in a smart controller, add-on or plug-in or other device. By way of example only, and without limitation, and referring particularly to the exemplary embodiment of FIG. 15, restricted watering and/or alternate smart/restricted schedules may be implemented as follows:

1. A small programming memory device can be provided with the controller, add-on, plug-in or other device with a USB connector.
2. If the restricted watering schedule is not pre-programmed into the controller, add-on, plug-in, or other device, the user is instructed to access a site on a PC or MAC that displays a computer screen, such the exemplary screen shown in FIG. 15.
3. The user clicks on the "MODIFY" button and begins to enter his restricted schedule. He identifies the water district or municipality and if his designated watering group (if any) is an even or odd street address or any other watering group. If the computer recognizes the water district, the screen could fill itself in completely automatically.
4. If the entered water district is not in the site data base, the user can then complete his own schedule by entering the information required such as the seasonal dates and the allowed watering times of the day for the different seasons.
5. Once the screen is either automatically filled out or manually programmed by the user, the user clicks on the "DONE" button to save the information.
6. If alternating use of smart or restricted watering is to be implemented, the bottom section of the computer screen is filled out as well. This provides dates during the year when smart technology is automatically implemented by zip code or location, and the dates during the year when restricted schedules are to be implemented.
7. The small data storage device is plugged into one of the computer's USB ports or other data access port.
8. The user then clicks on the "DOWNLOAD" button.
9. When the download has been completed and confirmed, "DOWNLOAD VERIFIED" shows on the screen.
10. The programming device is removed from the computer and plugged into the controller, add-on, plug-in or other device.
11. In some embodiments, the host device acknowledges receipt of the information by indicating "SCHEDULE ENTERED" or the like.
12. The controller, plug-in, add-on or other device will then allow irrigation according to the restricted water schedule dual restricted/smart use.
13. If the restricted schedule changes, the small plug in memory device can be re-programmed on the PC or MAC by clicking on the "MODIFY" button which will allow changes to the original program.

It is to be appreciated that the above scenario is by way of example, and that the input/updating of restricted watering schedules into a controller, add-on, plug-in or other device may be accomplished in numerous other ways, including manually, wirelessly, via computer download, over the internet, etc. For example, and without limitation, the following additional or alternative means of implementing restricted watering schedules and/or dual or alternating smart/restricted schedules are listed below:

Some alternatives to using PC programming include, without limitation, providing the restricted watering schedules with the use of a cell phone, iPhone, iPad, notebook, notepad, laptop computer or other electronic communication device. An application made for the input of restricted watering schedule data could be made for use with these mobile devices as well. An example could be a user accessing said application with an iPhone and entering a restricted water schedule or alternating use. The user could then send this information wirelessly to the controller, add-on, or plug-in device to allow implementation of such restricted watering schedule automatically.

Other examples include without limitation, a user accessing software designed to obtain restricted watering data. The user could input the restricted watering data into his desktop, laptop, iPad, iPhone, notebook computer, or other similar device. Next he would send this data to his controller wirelessly, through a USB connection, or another means to his controller, add-on, or plug-in device.

Other examples include without limitation, a web site designed to gather restricted watering schedules. A user could input his restricted watering data from his laptop or notebook computer, cell phone, iPhone, iPad, etc. based on his local watering rules. The information could then be transmitted wirelessly or through a USB connection to a controller, add-on, or plug-in device. It is to be appreciated that the above examples are a non-exhaustive list of potential computerized transmission means by which restricted watering schedules or other data may be provided to embodiments of central units, controllers, add-ons and/or plug-ins of the present invention.

In other embodiments, the controller, add-on, plug-in or other device may be used as an alternating device between smart technology and watering restrictions. By way of example, and without limitation, such additional implementation could be accomplished as follows:

1. Enter the local zip code if water budgeting is used;
2. Enter the month and day that smart watering is to start and end;
3. Enter the month and day that restricted watering is to start and end.

One reason to allow the device to alternate between automatic watering restrictions and smart technology is to make it possible to use smart technology during certain times of the year (with no watering restrictions), and use watering restrictions alone during the rest of the year. Similarly, some locations may require smart technology during certain times of the year with no restrictions during others. These embodiments also allow for automatically selecting the appropriate restricted water schedule for that time frame (e.g., the "winter" schedule of FIG. 6A during November-February, the "spring/fall" schedule during March-April and September-October, and the "summer" schedule during May-August). These embodiments also allow the local water district, municipality or other authority to change or update their restricted schedules, which may be downloaded into an embodiment of the present invention to assure compliance. These methods can be utilized to program a controller, add-on, plug-in or other device. Similar additional means of water conservation methods using cell phones, iPhones, iPads and the like as previously disclosed in the description of FIG. 15 also apply in these embodiments without limitation.

It is to be appreciated that these steps, or similar ones, may also be used to instruct a controller, add-on or plug-in to automatically choose between a selected restricted watering schedule and smart technology.

NON-LIMITING EXAMPLES OF
EMBODIMENTS OF THE PRESENT
INVENTION

Example 1

Use of Temperature Budgeting within a Controller, without the Use of any Form of ET The following example is provided for illustrative purposes only and without limiting the appended claims. This example assumes that the operator has already determined the preliminary irrigation schedule using any number of commonly available methods, such as personal experience, or from the system designer.

Assume for the purpose of this example that an irrigation controller embodying the present invention is to be installed in Fresno, Calif., at 10:15 a.m. on Feb. 15, 2004. However, this method can be used anywhere in the world. The zip code is a convenient way in the U.S. and that is why it is used. The operator installs the controller and enters the current time, date, month and year. If he is outside the U.S., he enters the expected average summer high temperature and the latitude. As an example, assume that somewhere in Southern Europe, the average July high temperature is 98° F. in July, and the latitude is 37° N. The temperature budgeting setup screen would then appear as follows:

Current Time/Date: 10:15 AM, Feb. 15, 2010
Average July High Temperature: 98° F.
Latitude of this Location: 37° N The controller immediately determines from its internal look-up table that the average summer RA factor at this particular latitude in July is 16.7. The controller then calculates the STBF to be 16.7×98=1636.6. Finally, he enters an irrigation schedule for his first irrigation station, which for this example is six (6) minutes of watering time three times a day.

Assume that the date is now November 2. The recorded high temperature for the previous period (twenty-four hours herein) was 52° F. The controller lookup table indicates that the RA on this particular day is 7.7. This means that the PTBF is 400 (the temperature of 52° F., multiplied by the RA of 7.7). Dividing the PTBF by the STBF provides a WBR value of approximately 0.244, or 24.4%. The irrigation duration for this particular period will be decreased to approximately 1.5 minutes of water (the 6 minute initial irrigation schedule, multiplied by the WBR value of 0.244=1.46 minutes of water), thrice per day.

The operator could also program the controller to suspend irrigation if the temperature at the beginning of an irrigation cycle is below the specified minimum temperature, or (if a precipitation sensor is included) if precipitation exists during, or before, an irrigation cycle. For example, assume that precipitation exists during the second watering irrigation time above. The precipitation sensor detects the existence of such precipitation, and communicates such existence to the controller, causing the controller to cancel the previously scheduled second watering duration of 1.5 minutes. Further assume that the minimum temperature is set at 35° F. Further assume that, at the beginning of the third irrigation time above, the current temperature was 34° F. This would cause the controller to cancel the previously scheduled third watering duration of 1.5 minutes.

As an even more user friendly alternative, the zip code or location specific historic environmental data and date and time is provided within the controller, add-on or plug-in.

This simple, intuitive, cost-effective, user-friendly approach encourages significantly higher long-term consumer participation, making it possible to save most of the wasted landscape water and subsequent runoff, which in California would be over one million acre feet. The additional infrastructure and environmental benefits of this water conservation have previously been enumerated by the EPA, as described herein.

Example 2

Use of Stored Historical ET in Determining the Water Budget Percentage without Calculating ET within the Embodiment The historical ET data shown in FIG. 1A is the same as FIG. 1 of parent U.S. Pat. Nos. 7,058,478, 7,266,428, 7,844, 368 and of pending application Ser. No. 12/955,839 from which this application claims priority. While no ET calculation is performed by any embodiment of the present invention, stored historical ET data can nevertheless be used in embodiments of the present invention in determining the water budget percentage (WBR). It is to be appreciated that historical ET is only used—not calculated—by any of the embodiments herein. Stored historic geo-environmental data could consist of monthly, weekly, or daily ET data and temperature data for a given geographic location, and may be identified, for example, by the zip code or latitude and longitude, etc.

The following example of determining a water budget percentage using historic ET is provided for illustrative purposes only and without limiting the appended claims. Assume that the historic ET data for a specified location (determined by a zip code or other location designation) is an ET of 14.0 inches for July, and the historic ET for the month of September is 10.8 inches. Assume that the historic July average high temperature is 97° F., and that the temperature for a particular day in September is 84° F. The water budget percentage for that day in September, using historical ET, would be determined by multiplying the current (September) high temperature times historic ET for the current month, divided by the average high temperature for July times historic average ET for July, as follows:

$$(84 \times 10.8)/(97 \times 14.0) = 66.7\%.$$

By way of comparison, determining the water budget percentage using temperature budgeting would need the Ra factors for July and September, which are 16.7 and 12.8 respectively. So the comparative calculation would be:

(84×12.8)/(97×16.7)=66.4%.

This example shows that the difference between the calculated water budget percentages is insignificant (66.7%-66.4%), such that either calculation may be used to reach a useful result without the need to calculate ET. The determined water budget percentage is then used to either adjust the run times periodically (e.g., daily) by the calculated percentage, or adjust the irrigation schedule by accumulating the percentage until a minimum threshold is reached. While historic monthly average ET data is used in this example, weekly or daily ET historic data may also be used.

As can be seen in this example, historic ET may be substituted for the equivalent ET expressed as the Ra factor. However, the methods of determining the water budget ratio or percentage is not to be limited by this or any specific equation. The water budget ratio is determined by comparing current geo-environmental sensor data to stored geo-environmental data and using it to adjust the irrigation schedule, or run times without calculating ET within the embodiments. The determined or calculated periodic water budget can also be applied daily to adjust the station run times or accumulated until a threshold level is reached to adjust the watering interval. While this example uses monthly historic ET, weekly or daily ET may also be used for specific days of the month for a specific location.

As noted previously, some embodiments do not require any form of ET. However, the use of historic ET, for example, as a substitute for Ra (the equivalent evaporation), is a viable alternative as illustrated in FIG. 1 of each of the parent patents and as noted by the SWAT results of FIGS. 5A, 5B, 5C, and the above comparison. The temperature budgeting methods (which may include historic ET) provide extremely reliable watering adjustment tools without all the ET variables nor any need to calculate ET within the embodiments of the present invention. FIGS. 5A-5C represent two irrigation controllers and an add-on, all using the preferred temperature budgeting method. The use of historical ET as an alternate method may appropriately still be called "temperature budgeting" because it only requires a minimum of one current sensor (temperature) data with the substitution of historic ET for the equivalent evapotranspiration (Ra).

As with other embodiments, once the water budget is determined, it can then be used to automate the existing manual water budget feature of a controller, or determined externally and communicated to a controller microprocessor by means of a plug-in type of add-on. Alternately, an add-on that attaches to the output of any controller can accumulate the water budget percentages and allow watering when a threshold is reached. A minimum of at least one environmental sensor is required (preferably temperature) although additional sensors such as a rain, wind, solar radiation, soil moisture, soil temperature, and relative humidity sensors may also be provided to allow for more exact calculations if needed. The current or real time sensor data may be provided by wired or wireless means.

Similar calculations can be performed using one of the stored historical ET curves as shown in FIG. 1a which are zip code specific, although similar ET historical curves may be used regionally.

It should be noted that in this embodiment, the stored historic ET method does not necessarily require the use of the Ra because Ra is already expressed as an equivalent evaporation as noted at the top of FIG. 2 in the same units of measurement as ET, in this case millimeters of water. Peak historic ET data is used for that zip code location and a daily, weekly, or monthly historic ET value is used along with historic temperature data and current temperature data in an equation similar to the above example to determine or calculate the water budget.

To re-emphasize, a water budget percentage is determined or calculated without calculating ET even if the stored data from which the percentage is determined may consists of historic ET data. The resulting water budget is then used to either adjust the irrigation schedule, watering interval, or station run times accordingly.

Example 3

Determining a Water Budget Percentage Using Soil Moisture Sensors

The following example of determining a water budget percentage using soil moisture sensors is provided for illustrative purposes only and without limiting the appended claims. In soil moisture sensing applications, a similar (but not identical algorithm) may be used. For example, historic soil temperature and moisture data can be provided to an irrigation or soil moisture sensing controller. Current soil temperature and moisture data is then provided on a real time basis from soil sensors and compared to the historic data for that location for that time or day of the year. A water budgeting percentage can therefore be calculated by comparing the current soil moisture and temperature data to historic soil moisture and temperature data for that location, which are considered geo-environmental data. This calculation yields a percentage which can then provide the amount of irrigation needed to replenish the root zone to a pre-determined level. More specifically, if the minimum root zone dry level is set to 20% moisture, and the maximum is set to 90%, the comparison of current to real time sensor data to historical data may say to activate the station run time by 70% of the summer run time to fill the root zone to the 90% level.

Example 4

Using a Plug-in Device to Determine and Implement a Water Budget Percentage

The following example is provided for illustrative purposes only and without limiting the appended claims. An existing (non smart) irrigation controller is provided with an input port to its microprocessor. A plug-in device is attached in communication with that microprocessor through the input port. One or more environmental sensors provide current or real time weather data to that plug-in by wired or wireless means. Those sensors may consist of ambient temperature, solar radiation, wind, relative humidity, precipitation, soil moisture, soil temperature, or combinations thereof. The plug-in module either is pre-programmed with local historical environmental data accessed by means of a location identifier (such as a zip code or latitude and longitude, or regionally), or such historical data is input. That historical (stored) data may consist of temperature, solar radiation, wind, relative humidity, or precipitation, or historic ET, soil moisture, soil temperature, or combinations thereof. Periodically, the sensors provide environmental data to the plug-in module. That real time data is compared to the stored geo-environmental data and a water budget is determined according to one of the methods outlined herein. This water budget is communicated to the host existing controller microprocessor which then either adjusts the set summer run times or the preliminary schedule according to the determined water budget percentage on a daily basis or an interval determined by accumulation.

Example 5

Using the Accumulation Method in a Controller, Add-on or Plug-in

The following example is provided for illustrative purposes only and without limiting the appended claims. An irrigation controller is programmed with a preliminary irrigation schedule using personal experience, internet based guidelines, with professional assistance or the like. A zip code or other location data is entered into the controller, add-on or plug-in from which historic data for that location is obtained such as latitude, temperature, ET, relative humidity, wind, precipitation, soil moisture, soil temperature, or combinations thereof. One or more environmental sensors are placed in communication with the controller, add-on or plug-in to provide current or real time data. The real time data is compared to the stored historic data to determine a periodic (preferably daily) water budget percentage. The controller, add-on or plug-in is programmed to accumulate the periodic percentages until a threshold is reached. For example, an accumulated percentage of at least 40% may be required before irrigation takes place. A minimum threshold percentage assures adequate penetration of the root zone. If a plug-in is used, the determined water budget percentages are communicated to the controller which may have been programmed with the minimum threshold.

In the case of an add-on, the existing irrigation controller is programmed with its preliminary or summer irrigation schedule and programmed to irrigate on given days. The add-on is mounted near the controller and has an internal cut off switch that is capable of breaking the common line. The add-on can be provided with a locator means such as a zip code which identifies the historical environmental data for that location, such as temperature, historic ET, relative humidity, solar radiation, wind, soil, or combinations thereof. One or more environmental sensors provide real time data to the add-on. The add-on periodically (preferably daily) determines the water budget. As a device that breaks the common line, the add-on could accumulate the daily water budget percentages until the threshold is reached, which may be for example 100% of the summer run times, at which time the common line is closed to allow irrigation to occur. On that day, the controller is allowed to run its summer irrigation schedule, assuming it is also an allowed watering day.

As an accumulation example, if it were November, the daily determined percentage may be 22% on a given day. No irrigation will be allowed that day. It may take 5 days or more during the cooler times of the year for the water budget accumulation to reach the 100% threshold. So the add-on will break the common line and prevent the controller from irrigating an average of four out of every five days in this example. If a restricted watering schedule is also imposed into the add-on simultaneously, the module will withhold irrigation until both the threshold is reached and an allowed watering day/time is reached. In this case, the module will continue accumulating the daily water budget percentages until an allowed watering day is reached. Most commonly, however, the add-on or plug-in or controller will either be used as a smart device, or as a TOU unit, not both together. The circumstances of the availability of water, and infrastructure capabilities will generally dictate which method is best for that municipality or water district.

Example 6

An Automated Restricted Watering Schedule in a Smart or Conventional Controller

The following example is provided for illustrative purposes only and without limiting the appended claims. A conventional or smart irrigation controller is located in a municipality which restricts irrigations to certain times of the day, or certain days of the week, or certain days of the month, depending on the street even or odd address or some other group designation. Municipal landscape watering restrictions have been common for decades, but always required manual initial setting and manual adjustment for seasonal changes. There are two novel approaches presented here and by the parent patents regarding automated watering restrictions. The first is the pre-programming of multiple restricted watering schedules within the controller from which one can be selected by, for example, entering a location identifier such as the name of the water district or town, by zip code, or latitude/longitude. This eliminates the need to program the entire restricted schedule manually into the controller, only the location. The second novelty is that once the schedule is selected, upon input of the date/time, the controller is capable of automatically adjusting the allowed watering days and times seasonally without the need for human intervention. As seen in FIG. 6B, the SNWA defines their seasons to be seasonally manually changed as follows: "Adjust your watering clock seasonally: September 1, November 1, March 1, and May 1". In addition, the allowed watering times also vary during the course of the year. For example, no irrigation is allowed from May 1 until October 1, from 11 a.m. to 7 p.m. The present invention would automate this requirement.

Automation of the water restriction features were proposed in the '244 patent preceded by its provisional applications. In a recent study by the SNWA, the use of an automated water restriction device reported the following compliance to the restrictions shown in FIGS. 6A and 6B: During the fall, an increase from 8% to 41%, from 11% to 41% in the winter, and from 15% to 31% in the spring. The total water savings from manual compliance to automated compliance yielded a savings of 13% for the three seasons reported. No report was made during the summer months. It can be assumed that automated non watering from 11 a.m. to 7 p.m. during the summer would have added to the savings. This compares favorably to the AquaCraft study referred to previously of 6.3% water savings from conventional to smart ET based controllers, particularly in view of the fact that the SNWA already had a degree of compliance before the study with the automation.

Advantages of Having Both Smart Technology and Automated Restricted Water Schedules Capability within a Controller, Add-on or Plug-in Various water districts or municipalities have different existing water related considerations and conditions:
 1. Some areas may have plentiful stored water, but limited pumping and delivery capability. This limitation could result in ineffective delivered water pressure, decreasing irrigation efficiency and increasing the watering times to account for this deficiency. At the same time, increased watering could lead to runoff pollution, and over watering in certain landscape zones leading to diseases.
 2. In areas where the infrastructure is currently adequate, rapidly increasing housing and population would reduce the ability of the existing infrastructure to handle future needs, leading to significant investment in infrastructure upgrading needs.

3. Some areas have an adequate infrastructure, but limited water supply from drought or limited water storage capacity.
4. Some areas have both a strained infrastructure and a limited water supply.

If the water supply is adequate, the intent is to reduce the load on the infrastructure. This can be accomplished by regulating the allowed watering days of the week or days of the month with even or odd address designations, and limiting the times of the day to limit landscape water use to off-peak water demand times of the day. In general, the intent is to distribute landscape irrigation to reduce the water demand load.

If the infrastructure is adequate but water is limited, either watering restrictions may be implemented or smart irrigation. Unfortunately, as observed herein, ET based controllers have gained limited acceptance, and even when used, have delivered disappointing water savings.

If the community or water district has both limited water supply and inadequate infrastructure, severely limiting landscape watering may be the only option primarily by restricted watering schedules. This was the case with the SNWA which tried to encourage the use of smart controllers with rebates, with very limited success. That is why they are now considering automated watering schedules based upon their recent study.

The ability to provide both smart water budget automation and automated restricted watering schedules provides considerable flexibility to a water district that may wish to begin with restricted schedules to satisfy infrastructure limitations, or to convert from watering limitations to smart technology (water budgeting) because a simpler more economical automated technology in a controller, add-on or plug-in will provide the greatest landscape water savings, depending upon the water conditions of the municipality.

Example 7

A Controller, Add-on or Plug with Both Temperature Budgeting Technology and Automated Time of Use for Restricted, Allowed, or not Allowed Watering Times The following example is provided for illustrative purposes only and without limiting the appended claims. A controller is programmed with its preliminary irrigation schedule. If a zip code is entered, the controller, add-on or plug in may automatically determine where it is located, and then gain access to historical geo-environmental data for that location. The unit then determines a periodic water budget, which may be used daily or by the accumulated method, with or without stored historical ET. One or more restricted watering schedules are made available to the unit, and may be selected by the user or determined according to user entry (zip code, date/time). The schedule appropriate for that location could be selected by entering a location designator from a list provided in the owner's manual, from an internet site, etc. An applicable restricted scheduled is then automatically selected by the unit. Based upon these restrictions, the unit would only irrigate or be allowed to irrigate based upon the selected schedule which could be time of day, day of the week, or day of the month dependent. In other embodiments, the local municipality may have different restrictions depending upon the time of the year, and the unit would select and/or change to different restrictions when applicable at different times. In embodiments using automatic water budgeting and automatic watering restrictions, the controller or add-on would automatically adjust its preliminary schedule according to the periodic water budget, and allow watering only on the allowed watering times of the day or watering days of the week or days of the month, accordingly. In embodiments using automatic water budgeting and automatic accumulation with watering restrictions, the controller or add-on would accumulate water budgets until a threshold is reached, and then allow watering only at the next allowed watering time of the day, or day of the week.

It is to be appreciated that one way embodiments of the present invention may comply with restricted watering schedules is to change station start times to begin at times when watering is allowed. For example, the start time may be set for 7:30 a.m., but local watering restrictions prohibit watering after 7:00 a.m. on the day watering is scheduled; in such a situation, instead of prohibiting watering altogether that day, embodiments of the invention may change the station start time to 6:00 when watering is allowed. The watering may be cut off at 7:00 a.m. when the restrictions go into effect.

Some embodiments illustrated in this example include:
1. Automated selection of one of multiple pre-programmed restricted watering schedules.
2. Automated seasonal change in watering restrictions.
3. The use of embodiments 1 or 2 in combination with a temperature budgeting method within a controller, add-on or plug-in.
4. The combination of 1 or 2 with any smart irrigation based controller, including ET based controllers.
5. An add-on that learns the summer run times and uses temperature budgeting to modify the run times daily
6. An add-on, plug-in, or controller that can operate as a smart controller during certain times of the year, and as a restricted schedule controller during other times of the year, for example during the summer months when watering may not be allowed during certain times of the day as in the SNWA area.

Example 8

A Self-contained Smart Controller

The following example is provided for illustrative purposes only and without limiting the appended claims. An irrigation controller is located in an outdoor pedestal as shown in FIG. 14. The housing may be metal or some form of plastic. The controller is programmed with a summer irrigation schedule. In a preferred embodiment, only a temperature sensor is required. This sensor is placed within the pedestal at a location where it most closely approximates the ambient temperature (preferably at ground level). A rain sensor may be optionally be built into the controller pedestal, as shown in FIG. 14. The smart technology of choice and/or restricted watering schedules are implemented within the controller microprocessor. The controller then irrigates according to its smart technology and/or the restricted watering schedules. If only the restricted watering schedules are used, the temperature sensor can be used as a freeze control device to shut down irrigation before the temperature reaches freezing. The rain sensor can shut down irrigation when there is a sufficient amount of precipitation. To make the controller totally self-contained and self powered, it may be solar, ambient light, or battery powered.

Example 9

An Add-on that Learns the Station Run Times and Adjusts Irrigation Accordingly The following example is provided for illustrative purposes only and without limiting the appended claims. A conventional controller is provided. An add-on module is provided that monitors the 24 VAC outputs of the conventional controllers and "learns" their run times. See FIGS. 13A and 13B. These figures disclose two embodiments, depicted as TBMs (temperature budgeting modules). The exemplary version of FIG. 13A monitors and learns each station run time, and on the subsequent times, cuts off each output independently according to the water budget determined for that day by means of multiple cutoff switches, one for each station. If the learned station run time for station 1 was 8 minutes, and today's water budget is 25%, the module would allow valve 1 to come on for 2 minutes then cut it off.

The second exemplary version is depicted in FIG. 13B. Here, each station is still monitored and the run time learned, but the wires to each valve are in parallel with the TBM wires. The common line is broken in this case to all the valves at once, instead of each individual station line. Once again, the module learns the run times, and on subsequent station activations cuts off each station operation, based on the water budget, by cutting off the common line.

The advantage of the first version is that each station can be operated independently. However, additional electronic circuitry and one output switch is required with each station, which adds cost and size to the module. The second version is less complicated, but if more than one station is operated at a time, stations will need to go on and off according to the breaking of the common line to satisfy the full water budge percentage.

Example 10

Central Unit Sending Data to Remote Controller(s), Add-on(s) or Plug-In(s)

The following example is provided for illustrative purposes only and without limiting the appended claims. A centrally located unit is provided with a microprocessor and a means for sending out data, such as, without limitation, a transmitter and antenna (for broadcasting), a wireless network link, an internet communication link (wired or wireless), or even hard-wired communications. One or more receiving units (which may themselves be controllers, add-ons and/or plug-ins) are provided as shown in FIGS. 9A-9C. The receiving units are in communication with the central unit and may have, without limitation, radio/wireless receivers, internet connections, hard wired links, etc. In different embodiments, the central unit may address the receiving units as a group or individually.

The various steps and apparatus of embodiments of the present invention may be divided between the central unit and the receiving units in a multitude of combinations. Turning first to implementation of water budgeting, for example, and without limitation, in some embodiments, the central unit may generate the water budget percentages and send them to the receiving units for implementation. In other embodiments, the central unit may simply provide current environmental data to the receiving units which themselves generate and then implement the water budget percentages. In other embodiments the receiving units may have their own environmental sensor(s) and not require anything from the central unit to generate water budget percentages. In some embodiments, water budget percentages may be accumulated in the central unit; in other embodiments, those percentages may be accumulated in the receiving units. Each of these water budgeting examples may or may not be combined with automatic implementation of restricted watering schedules.

Turning to automatic implementation of restricted watering schedules, for example, and without limitation, in some embodiments, the central unit may receive several sets of watering restrictions (e.g., different restrictions being applicable at different seasons of the year), and the central unit decides which restrictions are currently in effect and sends those to the receiving units. In other embodiments, the central unit sends all of the restriction sets to the receiving units which themselves determine which one is currently applicable.

In very simple embodiments, the central unit may perform numerous functions and simply send a "ok to water" or "not ok to water" signal (or a "start watering"/"stop watering" signal) to the receiving units. It is to be appreciated that these are only some examples of how the steps and apparatus of embodiments of the present invention may be divided up between the central unit and the receiving units.

Typical Instructions for Automated Selection, Programming, and Implementation of Restricted Watering Schedules in a Smart or Conventional Controller, Add-on or Plug-in:

It is important to note that the following exemplary procedure for automatically selecting, programming, and seasonally changing restricted watering schedules is without limitation to the claims herein.

STEP 1: Some restricted watering schedules are pre-programmed into your controller, add-on or plug-in. Go to that function on your device and enter your zip code to determine if your restricted schedule is pre-programmed. If it appears, enter it to enable it.

STEP 2: Enter your group designation if applicable (even, odd, group designation, etc. . . . ) and your drought stage if specified.

STEP 3: If your allowed watering schedule is not available, access the designated site on your computer.

STEP 4: Enter your zip code on that screen and your schedule will appear. Enter your designated watering group and drought stage if applicable.

STEP 5: If your restricted schedule has changed, you may manually update the schedule on the screen and click on the "UPDATE" button.

STEP 6: Insert your programming device into one of the computer's USB ports and click on the "DOWNLOAD" button.

STEP 7: Remove the programming device and plug it into the host controller, add-on or plug-in module. The schedule or updated schedule will automatically be implemented, including seasonal changes as specified by the water district or municipality.

Dual Use of Water Budgeting or any Smart Technology (Including ET Based or any Other Smart Technology or Soil Moisture Sensing Method) and Restricted Watering Schedules Assume that in the SNWA area, it would be beneficial to minimize evaporation during the summer months. As noted in FIG. 6B, from May 1 until October 1, no watering is allowed daily from 11 a.m. to 7 p.m. An embodiment of an add-on, plug-in, controller or other device could be programmed as follows to maximize irrigation efficiency:

1. If the combination of any smart water technology and watering restrictions is in a controller, it may be programmed to operate as a smart controller in the fall, winter, and spring months. However, during the summer, since it is likely that most days in the Southern Nevada climate would require nearly 100% irrigation which would save little or no water, this controller embodiment automatically switches to the watering restrictions mode (TOU) to prohibit irrigation, for example, from 11 a.m. to 7 p.m. to minimize evaporation.

2. If the combination of smart water technology and watering restrictions is in a plug-in embodiment, the irrigation schedule determined by smart technology (of the present invention or otherwise) is communicated to the controller during the fall, winter, and spring, and automatically replaced with the limited allowed watering times of the day during the summer.

3. If the combination of smart technology is in an add-on embodiment, the add-on would automatically allow irrigation when either the accumulated percentages or the ET have reached their threshold during the fall, winter, and spring, then automatically convert to the watering restrictions during the summer by opening the contact (preventing irrigation) from 11 a.m. to 7 p.m. each day.

4. If the combination is done as a central system embodiment, the embodiment automatically switches from smart technology during fall, winter, and spring to time of use during the summer.

The ability to have both smart technology and time of use capability in one controller, add-on or plug-in as well as a central system offers a wide range of capabilities to suit the region's conditions of water availability and infrastructure capabilities.

It is to be understood that variations and modifications of the embodiments of the present invention may be made without departing from the scope thereof. In particular, the scope of the invention includes embodiments having different combinations of the features and elements disclosed herein. It is also to be understood that the present invention is not to be limited by any of the particular embodiments, examples, illustrations, equations, or specific variables disclosed herein, but only in accordance with the appended claims when read in light of the foregoing specification.

What is claimed is:

1. An irrigation controller comprising:
   a. self-adjusting technology and a calendar, wherein said self-adjusting technology is water budget percentage based, wherein a current water budget percentage is periodically determined by comparing current environmental sensor data to historical geo-environmental data without calculating current reference evapotranspiration;
   b. at least one restricted watering schedule; and
   c. programming in said controller for irrigating by alternating between said self-adjusting technology or a restricted watering schedule, one to the exclusion of the other, based on dates in said calendar.

2. An irrigation controller comprising:
   a. a microprocessor having a calendar and self-adjusting technology that is water budget percentage based, wherein a current water budget percentage is periodically determined without calculating current reference evapotranspiration;
   b. at least one restricted watering schedule provided to said microprocessor; and
   c. said microprocessor being capable of operating by alternating between said water budgeting technology or said restricted watering schedule, one to the exclusion of the other, based on said calendar.

3. An irrigation system comprising:
   a. an irrigation controller mounted within an outdoor above ground mounted non-portable enclosure, a temperature sensor located near ground level within said enclosure in communication with said controller, and at least one additional sensor selected from the group of precipitation, solar radiation, relative humidity, wind, and combinations thereof in communication with said controller;
   b. said controller programmed with self-adjusting technology, restricted watering schedules, and a calendar; and
   c. dates programmed in said calendar according to which said controller operates using either said self-adjusting technology or said restricted watering schedules, one to the exclusion of the other.

4. A method of adjusting an irrigation schedule of a controller comprising the steps of:
   a. determining a preliminary irrigation schedule without using current reference evapotranspiration data;
   b. periodically determining a current water budget percentage; and
   c. automatically adjusting said determined preliminary irrigation schedule using said current water budget percentage.

5. The method of claim 4 wherein said determined preliminary irrigation schedule is a schedule for use during summer.

6. The method of claim 4 wherein said determined preliminary irrigation schedule is a schedule for use during a time other than summer.

7. The method of claim 4 comprising the additional steps of:
   a. providing a schedule of restricted watering times; and
   b. providing dates to said controller when said determined preliminary irrigation schedule is to be restricted exclusively according to said restricted watering schedule, and other dates during the year when said determined preliminary irrigation schedule is to be exclusively adjusted by said current water budget percentage.

8. The method of claim 7 wherein the dates during which the determined preliminary irrigation schedule is restricted exclusively according to said restricted watering schedule occur during the summer, and the dates during which the determined preliminary irrigation schedule is exclusively adjusted by said current water budget percentage occur during the rest of the year.

9. The method of claim 4 wherein the step of adjusting said irrigation schedule comprises adjusting one of the group of a station run time, a station start time, a watering day, a watering interval, and combinations thereof.

10. The method of claim 4 comprising the additional step of providing said controller with at least one environmental sensor selected from the group of: an ambient air temperature sensor, solar radiation sensor, relative humidity sensor, wind sensor, soil moisture sensor, soil temperature sensor, precipitation sensor, and combinations thereof.

11. The method of claim 4 comprising the additional steps of:
    a. providing said controller with at least one restricted watering schedule;
    b. providing said controller with a calendar programmed with dates during which said current water budget percentage or a restricted watering schedule is to be implemented, one to the exclusion of the other.

12. The method of claim 4 wherein said current water budget percentage is determined within said controller.

13. The method of claim 4 wherein said current water budget percentage is determined within a separate module in communication with said controller.

14. The method of claim 4 wherein said current water budget percentage is determined at a central location and transmitted to said controller.

15. The method of claim 4 wherein said controller is mounted according to one of the group of: indoor wall mounted, outdoor wall mounted, outdoor post mounted, outdoor ground mounted, and outdoor below ground valve box located.

16. The method of claim 4 wherein said controller is powered by a member selected from the group of: AC, DC, solar, battery, and ambient light.

17. The method of claim 4 wherein said current water budget percentage is determined in a module placed on at least one output of said controller.

18. The method of claim 4 wherein the step of determining said current water budget percentage is performed using data from at least one environmental sensor in comparison with historical geo-environmental data.

19. The method of claim 18 wherein said at least one environmental sensor is selected from the group of ambient temperature, soil temperature, soil moisture, solar radiation, wind, relative humidity, precipitation, and combinations thereof.

20. An irrigation controller comprising:
 a. a preliminary irrigation schedule determined without using current reference evapotranspiration data; and
 b. programming to periodically automatically determine a current water budget percentage to adjust said preliminary irrigation schedule.

21. The controller of claim 20 wherein said current water budget percentage is determined by comparing current data from at least one environmental sensor to stored historic geo-environmental data.

22. The controller of claim 21 wherein said current data is selected from the group of ambient temperature, precipitation, solar radiation, wind, relative humidity, soil moisture, soil temperature, and combinations thereof.

23. The controller of claim 21 wherein said stored historic geo-environmental data is selected from the group of reference evapotranspiration, ambient temperature, solar radiation, precipitation, wind, relative humidity, soil moisture, soil temperature, and combinations thereof.

24. The controller of claim 20 wherein power is provided by one of the group of battery, ambient light, solar panel, and AC.

25. The controller of claim 20 wherein said determined preliminary irrigation schedule is a schedule for use during a time other than summer.

26. The controller of claim 20 wherein said determined preliminary irrigation schedule is a schedule for use during summer.

27. The controller of claim 20 further comprising calendar dates during which said determined preliminary irrigation schedule is exclusively adjusted according to said current water budget percentage, and other calendar dates during which said determined preliminary irrigation schedule is not adjusted but is exclusively enabled according to programmed allowed watering days.

28. The controller of claim 27 wherein the determined preliminary irrigation schedule is enabled according to said allowed watering days exclusively during summer and said determined preliminary irrigation schedule is adjusted based on said periodically determined current water budget percentage during the rest of the year.

29. An irrigation system comprising:
 a. An irrigation controller having a preliminary irrigation schedule determined without using current reference evapotranspiration data;
 b. A module in communication with said controller;
 c. Said module capable of periodically determining a current water budget percentage and communicating it to said controller to periodically adjust said preliminary irrigation schedule.

30. The irrigation system of claim 29 further comprising at least one environmental sensor in communication with said module.

31. The irrigation system of claim 30 wherein said at least one environmental sensor is selected from the group of ambient temperature, precipitation, solar radiation, relative humidity, wind, soil moisture, soil temperature, and combinations thereof.

32. The irrigation system of claim 30 wherein communication between said at least one environmental sensor and said module is provided by wired or wireless means.

33. The irrigation system of claim 29 wherein said at least one environmental sensor is located within or upon an outdoor ground mounted controller housing.

34. The irrigation system of claim 29 wherein said current water budget percentage is determined by comparing stored historic geo-environmental data to current sensor data.

35. The irrigation system of claim 34 wherein said stored historic geo-environmental data is selected from the group of evapotranspiration, ambient temperature, wind, relative humidity, soil moisture, soil temperature, precipitation, extraterrestrial radiation, solar radiation, and combinations thereof.

36. The irrigation system of claim 29 further comprising a central control with a calendar programmed with dates in communication with said module when said current water budget percentage or watering restrictions are enabled, one to the exclusion of the other.

37. The irrigation system of claim 29 wherein said adjustment to said irrigation schedule is selected from the group of adjusting a station run time, adjusting a watering interval, adjusting a watering day, adjusting a start time, and combinations thereof.

38. An irrigation system comprising:
 a. a centrally located control;
 b. at least one environmental sensor in communication with said control;
 c. at least one remotely mounted irrigation controller having a preliminary irrigation schedule determined without using current reference evapotranspiration data;
 d. said central control being capable of periodically determining a current water budget percentage and communicating it to said at least one remote controller;
 e. said at least one remote controller being capable of adjusting said preliminary irrigation schedule according to said communicated water budget percentage.

39. The irrigation system of claim 38 further comprising at least one irrigation shutdown sensor in communication with said central control selected from the group of precipitation, wind, freeze, and combinations thereof.

40. The irrigation system of claim 38 wherein said at least one environmental sensor is selected from the group of ambient temperature, solar radiation, wind, relative humidity, precipitation, and combinations thereof.

41. The irrigation system of claim 38 wherein the adjustment to said preliminary irrigation schedule of said at least one remote controller is selected from adjusting one of the group of: station run times, start times, watering days, watering intervals, and combinations thereof according to said periodically communicated water budget percentage.

42. The irrigation system of claim 38 wherein said control is a central broadcasting module.

43. The irrigation system of claim 38 wherein said central control is a computer.

44. The irrigation system of claim 38 wherein said at least one environmental sensor is in wired or wireless communication with said control.

45. The irrigation system of claim 38 wherein said remote controllers are powered by one of the group of AC, DC, solar, ambient light, battery, and combinations thereof.

46. The irrigation system of claim 38 further comprising calendar dates during which either said water budget percentage is implemented or a restricted watering schedule is implemented on said at least one remote controller, one to the exclusion of the other.

47. A water budget based self-adjusting irrigation controller comprising a microprocessor programmed with a water budget percentage threshold, a preliminary irrigation schedule derived without using current reference evapotranspiration data, and programming capable of periodically determining current water budget percentages and accumulating said percentages until said threshold is reached before allowing irrigation to take place.

48. The controller of claim 47 wherein said microprocessor is further programmed with at least one restricted watering schedule and a calendar with dates during which either said water budget based self-adjusting irrigation is implemented or a restricted watering schedule is implemented, one to the exclusion of the other.

49. A method of affecting irrigation using an irrigation controller comprising the steps of:
   a. providing a schedule of restricted watering times not derived using current reference evapotranspiration data to said controller in communication with at least one irrigation valve; and
   b. said controller disabling said at least one valve at times during said restricted watering times.

50. The method of claim 49 wherein said restricted watering times are provided in a module, and wherein said module provides said restricted watering times to said controller.

51. The method of claim 49 comprising the additional steps of:
   a. programming self-adjusting technology into said controller;
   b. providing a calendar to said controller with dates during which either said restricted watering times or said self-adjusting technology is to be enabled, one to the exclusion of the other; and
   c. said controller adjusting irrigation based on what is enabled according to said dates.

52. The method of claim 51 wherein said self-adjusting technology is water budget percentage based.

53. A method of affecting irrigation using an irrigation controller comprising the steps of:
   a. providing self-adjusting technology and at least one schedule of restricted watering times not derived using current reference evapotranspiration data in a module in communication with said controller;
   b. providing said module with a calendar having dates during which either said self-adjusting technology or said restricted watering times are specified; and
   c. said module instructing said controller to alternate between either said self-adjusting technology or said restricted watering times based on said calendar dates, one to the exclusion of the other.

54. The method of claim 53 wherein said self-adjusting technology is water budget percentage based.

55. The method of claim 54 wherein a current water budget percentage is periodically determined by comparing current environmental data to historic geo-environmental data for a location.

56. An irrigation system at a location comprising:
   a. a centrally located control in communication with at least one environmental sensor;
   b. at least one remotely mounted irrigation controller having a preliminary irrigation schedule determined without using current reference evapotranspiration data;
   c. said central control being capable of periodically determining a current water budget percentage and communicating it to said at least one remote controller; and
   d. said at least one remote controller being capable of adjusting said preliminary irrigation schedule according to said communicated water budget percentage.

57. The irrigation system of claim 56 wherein said current water budget percentage is determined by comparing current environmental sensor data to historic geo-environmental data for said location.

58. A method of adjusting an irrigation schedule of a controller comprising the steps of:
   a. determining an irrigation schedule without using current reference evapotranspiration data;
   b. periodically determining a current water budget percentage; and
   c. automatically periodically adjusting the determined irrigation schedule using said current water budget percentage.

59. The method of claim 58 wherein said current water budget percentage is determined within said controller.

60. The method of claim 58 wherein said current water budget percentage is determined within a module in communication with said controller.

61. The method of claim 58 wherein said current water budget percentage is determined in a module that breaks a common line to at least one irrigation valve of said controller.

62. The method of claim 58 comprising the additional steps of:
   a. providing a schedule of restricted watering times to said controller; and
   b. providing dates to said controller when said irrigation schedule is to be restricted exclusively according to said restricted watering schedule, and other dates when said preliminary irrigation schedule is to be exclusively adjusted by said current water budget percentage.

63. The method of claim 62 wherein the dates during which the preliminary irrigation schedule is restricted exclusively according to said restricted watering schedule occur during the summer, and the dates during which the preliminary irrigation schedule is exclusively adjusted by said current water budget percentage occur during the rest of the year.

64. An irrigation system comprising:
   a. a controller having a preliminary irrigation schedule determined without using current reference evapotranspiration data; and
   b. programming to automatically periodically determine a current water budget percentage to periodically adjust said irrigation schedule.

65. The irrigation system of claim 64 further comprising calendar dates during which said preliminary irrigation schedule is exclusively adjusted according to said current water budget percentage, and other calendar dates during which said preliminary irrigation schedule is not adjusted but is exclusively enabled according to programmed allowed watering days.

66. The irrigation system of claim 64 wherein said current water budget percentage is determined within said controller.

67. The irrigation system of claim 64 wherein said current water budget percentage is determined within a module in communication with said controller.

68. The irrigation system of claim 64 wherein said current water budget percentage is determined in a module that breaks a common line to at least one irrigation valve of said controller.

69. The irrigation system of claim 64 wherein said current water budget percentage is determined by a central system in communication with said controller.

70. A method of affecting irrigation using an irrigation controller comprising the steps of:
   a. providing a schedule of allowed watering times to said controller wherein said schedule is determined by location and not derived using current reference evapotranspiration data;
   b. periodically determining a current water budget percentage;
   c. adjusting an irrigation schedule of said controller according to said current water budget percentage; and
   d. said controller operating according to said adjusted irrigation schedule when allowed according to said schedule of allowed watering times.

71. The method of claim 70 wherein said current water budget percentage is partially determined by current environmental sensor data for said location.

72. The method of claim 71 wherein said current water budget percentage is determined by comparing said current environmental sensor data to historical environmental data for said location.

73. The method of claim 72 wherein said current water budget percentage is determined in one of the group of a plug-in, an add-on, and a central location, and wherein said percentage is communicated to said controller.

* * * * *